United States Patent
Duncan et al.

(10) Patent No.: US 9,139,202 B2
(45) Date of Patent: Sep. 22, 2015

(54) VEHICLE COLLISION MANAGEMENT RESPONSIVE TO ADVERSE CIRCUMSTANCES IN AN AVOIDANCE PATH

(71) Applicant: Elwha LLC, Bellevue, WA (US)

(72) Inventors: William David Duncan, Mill Creek, WA (US); Roderick A. Hyde, Redmond, WA (US); Robert C. Petroski, Seattle, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 14/160,120

(22) Filed: Jan. 21, 2014

(65) Prior Publication Data

US 2015/0203112 A1    Jul. 23, 2015

(51) Int. Cl.
*G06F 17/10* (2006.01)
*B60W 30/095* (2012.01)

(52) U.S. Cl.
CPC .................................. *B60W 30/095* (2013.01)

(58) Field of Classification Search
USPC ......................................................... 701/301
See application file for complete search history.

(56) References Cited

U.S. PATENT DOCUMENTS

| 7,085,637 | B2 | 8/2006 | Breed et al. |
| 8,195,371 | B2 | 6/2012 | Yasui et al. |
| 2002/0016653 | A1 | 2/2002 | Levine |
| 2005/0060069 | A1 | 3/2005 | Breed et al. |
| 2005/0065711 | A1 | 3/2005 | Dahlgren et al. |
| 2005/0125153 | A1 | 6/2005 | Matsumoto et al. |
| 2005/0171690 | A1* | 8/2005 | Brass et al. .................... 701/207 |
| 2006/0239509 | A1 | 10/2006 | Saito |
| 2007/0080825 | A1* | 4/2007 | Shiller .......................... 340/903 |
| 2009/0187322 | A1 | 7/2009 | Yasui et al. |
| 2009/0268946 | A1 | 10/2009 | Zhang et al. |
| 2010/0063736 | A1* | 3/2010 | Hoetzer ........................ 701/301 |
| 2010/0228427 | A1 | 9/2010 | Anderson et al. |
| 2010/0289632 | A1 | 11/2010 | Seder et al. |
| 2011/0015818 | A1* | 1/2011 | Breuer et al. .................... 701/29 |
| 2012/0330541 | A1 | 12/2012 | Sakugawa et al. |
| 2013/0103259 | A1 | 4/2013 | Eng et al. |
| 2013/0278442 | A1 | 10/2013 | Rubin et al. |

(Continued)

OTHER PUBLICATIONS

Johnson, Gary L.; "Defining risk assessment confidence levels for use in project management communications" Dissertation Abstract; Udini by ProQuest; printed on Dec. 3, 2013; pp. 1-13; located at: http://udini.proquest.com/view.defining-risk-assessment-confidence-goid:304174424/.

(Continued)

*Primary Examiner* — Hussein A. Elchanti

(57) ABSTRACT

Described embodiments include a system and a method. A system includes an evaluation circuit configured to determine a characteristic of an adverse circumstance present in a possible collision avoidance path of a vehicle. The system includes a rating circuit configured to assign a risk value to the possible collision avoidance path responsive to the determined characteristic of the adverse circumstance. The system includes an uncertainty assessment circuit configured to assign an uncertainty to the risk value. The system includes a threshold circuit configured to determine if the risk value of the possible collision avoidance path and the uncertainty in a combination meet a threshold criteria. The system includes a communication circuit configured to output the possible collision avoidance path as a selected collision avoidance path if the threshold criteria is met.

32 Claims, 15 Drawing Sheets

(56) References Cited

U.S. PATENT DOCUMENTS

2014/0067206 A1* 3/2014 Pflug .................... 701/41
2014/0303847 A1* 10/2014 Lavoie ................... 701/41
2015/0094943 A1* 4/2015 Yoshihama et al. ......... 701/301

OTHER PUBLICATIONS

Stott, Kelvin; "Understanding Risk & Uncertainty"; Mar. 2012; pp. 1-30.

Tong et al.; "A Research on Risk Assessment and Warning Strategy for Intersection Collision Avoidance System"; Proceedings of the 12$^{th}$ International IEEE Conference on Intelligent Transportation Systems; Oct. 3-7, 2009; pp. 388-393; IEEE.

Wikipedia; "Three-point estimation"; Apr. 14, 2013; pp. 1-3; located at: http://en.wikipedia.org/wiki/Three-point_estimation.

PCT International Search Report; International App. No. PCT/US2015/011993; May 1, 2015; pp. 1-3.

* cited by examiner

VEHICLE COLLISION MANAGEMENT RESPONSIVE TO ADVERSE CIRCUMSTANCES IN AN AVOIDANCE PATH

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)).

Priority Applications

None.

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

SUMMARY

For example, and without limitation, an embodiment of the subject matter described herein includes a system. The system includes an evaluation circuit configured to determine a characteristic of an adverse circumstance present in a possible collision avoidance path of a vehicle. The system includes a rating circuit configured to assign a risk value to the possible collision avoidance path responsive to the determined characteristic of the adverse circumstance. The system includes a selector circuit including a rule-set structured to select a collision avoidance path from at least two possible collision avoidance paths in response to an evaluation of a respective assigned risk value for each of the at least two possible collision avoidance paths.

In an embodiment, the system includes a collision avoidance circuit configured to generate a collision avoidance instruction responsive to the selected collision avoidance path. In an embodiment, the system includes a collision avoidance circuit configured to generate at least two possible collision avoidance paths of the vehicle responsive to an environment or situation indicating a possible collision threat. In an embodiment, the system includes a display device configured to display a human perceivable presentation of an aspect of the selected collision avoidance path. In an embodiment, the system includes a vehicle operations controller configured to initiate an implementation of an aspect of the selected collision avoidance path by a control system of the vehicle. In an embodiment, the system includes a sensor configured to acquire data indicative of the adverse circumstance present in the possible collision avoidance path of the vehicle. In an embodiment, the system includes another sensor configured to acquire data indicative of an environment or situation external to the vehicle.

For example, and without limitation, an embodiment of the subject matter described herein includes a method. The method includes determining a characteristic of a first adverse circumstance present in a first possible collision avoidance path of a vehicle. The method includes assigning a first risk value to the first possible collision avoidance path responsive to the determined characteristic of the first adverse circumstance. The method includes determining a characteristic of a second adverse circumstance present in a second possible collision avoidance path of the vehicle. The method includes assigning a second risk value to the second possible collision avoidance path responsive to the determined characteristic of the second adverse circumstance. The method includes selecting a collision avoidance path from the first possible collision avoidance path or the second possible collision avoidance path in response to an evaluation of the first risk value and the second risk value. The method includes outputting the selected collision avoidance path.

In an embodiment, the method includes generating a collision avoidance instruction responsive to the selected collision avoidance path. In an embodiment, the method includes generating at least two possible collision avoidance paths of the vehicle responsive to an environment or situation indicating a possible collision threat. In an embodiment, the method includes displaying a human perceivable presentation of an aspect of the selected collision avoidance path. In an embodiment, the method includes initiating an implementation of an aspect of the selected collision avoidance path by a control system of the vehicle. In an embodiment, the method includes acquiring data indicative of the first adverse circumstance present in the possible first collision avoidance path of the vehicle; and acquiring data indicative of the second adverse circumstance present in the possible second collision avoidance path of the vehicle. In an embodiment, the method includes saving the selected collision avoidance path in a computer readable medium.

For example, and without limitation, an embodiment of the subject matter described herein includes a method. The method includes determining a characteristic of a first adverse circumstance present in a first possible collision avoidance path of a vehicle. The method includes assigning a first risk value to the first possible collision avoidance path responsive to the determined characteristic of the first adverse circumstance. The method includes assigning a first uncertainty to the first risk value. The method includes determining a characteristic of a second adverse circumstance present in a second possible collision avoidance path of the vehicle. The method includes assigning a second risk value to the second possible collision avoidance path responsive to the determined characteristic of the second adverse circumstance. The method includes assigning a second uncertainty to the second risk value. The method includes selecting a collision avoidance path from the first possible collision avoidance path and the second possible collision avoidance path, the selection responsive to an evaluation of the first risk value and the first uncertainty assigned to the first risk value relative to the second risk value and the second uncertainty assigned to the second risk value. The method includes outputting the selected collision avoidance path.

In an embodiment, the method includes displaying a human perceivable presentation of an aspect of the selected collision avoidance path. In an embodiment, the method includes initiating an implementation of an aspect of the selected collision avoidance path by a control system of the vehicle.

For example, and without limitation, an embodiment of the subject matter described herein includes a system. The system includes an evaluation circuit configured to determine a characteristic of an adverse circumstance present in a possible collision avoidance path of a vehicle. The system includes a rating circuit configured to assign a risk value to the possible collision avoidance path responsive to the determined characteristic of the adverse circumstance. The system includes an uncertainty assessment circuit configured to assign an uncertainty to the risk value. The system includes a threshold circuit configured to determine if the risk value of the possible collision avoidance path and the uncertainty in a combination meet a threshold criteria. The system includes a communication circuit configured to output the possible collision avoidance path as a selected collision avoidance path if the threshold criteria is met.

In an embodiment, the system includes a collision avoidance circuit configured to generate at least two possible collision avoidance paths of the vehicle responsive to an environment or situation indicating a possible collision threat; and an iteration manager circuit configured to initiate, upon a determination that a first of the at least two possible collision avoidance paths does not meet the threshold criteria, a determination if a second of the at least two collision avoidance paths meets the threshold criteria. In an embodiment, the system includes an instruction generator configured to generate a collision avoidance instruction responsive to the selected collision avoidance path. In an embodiment, the system includes a display device configured to display a human perceivable presentation of an aspect of the selected collision avoidance path. In an embodiment, the system includes a vehicle operations controller configured to initiate an implementation of an aspect of the selected collision avoidance path by a control system of the vehicle. In an embodiment, the system includes a sensor configured to acquire data indicative of the adverse circumstance present in the possible collision avoidance path of the vehicle.

For example, and without limitation, an embodiment of the subject matter described herein includes a method. The method includes determining a characteristic of a first adverse circumstance present in a first possible collision avoidance path of a vehicle. The method includes assigning a first risk value to the first possible collision avoidance path responsive to the determined characteristic of the first adverse circumstance. The method includes assigning a first uncertainty to the first risk value. The method includes determining if the first risk value of the first possible collision avoidance path and the first uncertainty in a combination meet a threshold criteria. The method includes outputting the first possible collision avoidance path as a selected collision avoidance path if the threshold criteria is met.

In an embodiment, the method includes displaying a human perceivable presentation of an aspect of the selected collision avoidance path. In an embodiment, the method includes initiating an implementation of an aspect of the selected collision avoidance path by a control system of the vehicle. In an embodiment, the method includes generating a collision avoidance instruction responsive to the selected collision avoidance path. In an embodiment, the method includes determining a characteristic of a second adverse circumstance present in a second possible collision avoidance path of the vehicle. In an embodiment, the method includes assigning a second risk value to the second possible collision avoidance path responsive to the determined characteristic of the second adverse circumstance. In an embodiment, the method includes assigning a second uncertainty to the second risk value. In an embodiment, the method includes determining if the second risk value of the second possible collision avoidance path and the second uncertainty in a combination meet the threshold criteria. In an embodiment, the method includes outputting the second possible collision avoidance path as the selected collision avoidance path if the threshold criteria is met. In an embodiment, the method includes displaying a human perceivable presentation of an aspect of the selected collision avoidance path. In an embodiment, the method includes generating a collision avoidance instruction responsive to the selected collision avoidance path. In an embodiment, the method includes initiating an implementation of an aspect of the selected collision avoidance path by a control system of the vehicle.

For example, and without limitation, an embodiment of the subject matter described herein includes a method. The method includes determining a characteristic of a first adverse circumstance present in a first possible collision avoidance path of a vehicle. The method includes assigning a first risk value to the first possible collision avoidance path responsive to the determined characteristic of the first adverse circumstance. The method includes assigning a first uncertainty to the first risk value. The method includes determining a characteristic of a second adverse circumstance present in a second possible collision avoidance path of the vehicle. The method includes assigning a second risk value to the second possible collision avoidance path responsive to the determined characteristic of the second adverse circumstance. The method includes assigning a second uncertainty to the second risk value. The method includes establishing a threshold criteria responsive to a combination of the second risk value of the second possible collision avoidance path and the second uncertainty. The method includes determining if the first risk value of the first possible collision avoidance path and the first uncertainty in a combination meets the threshold criteria. The method includes outputting the first possible collision avoidance path as a selected collision avoidance path if the threshold criteria is met. In an embodiment, the method includes outputting the second possible collision avoidance path as a selected collision avoidance path if the threshold criteria is not met.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
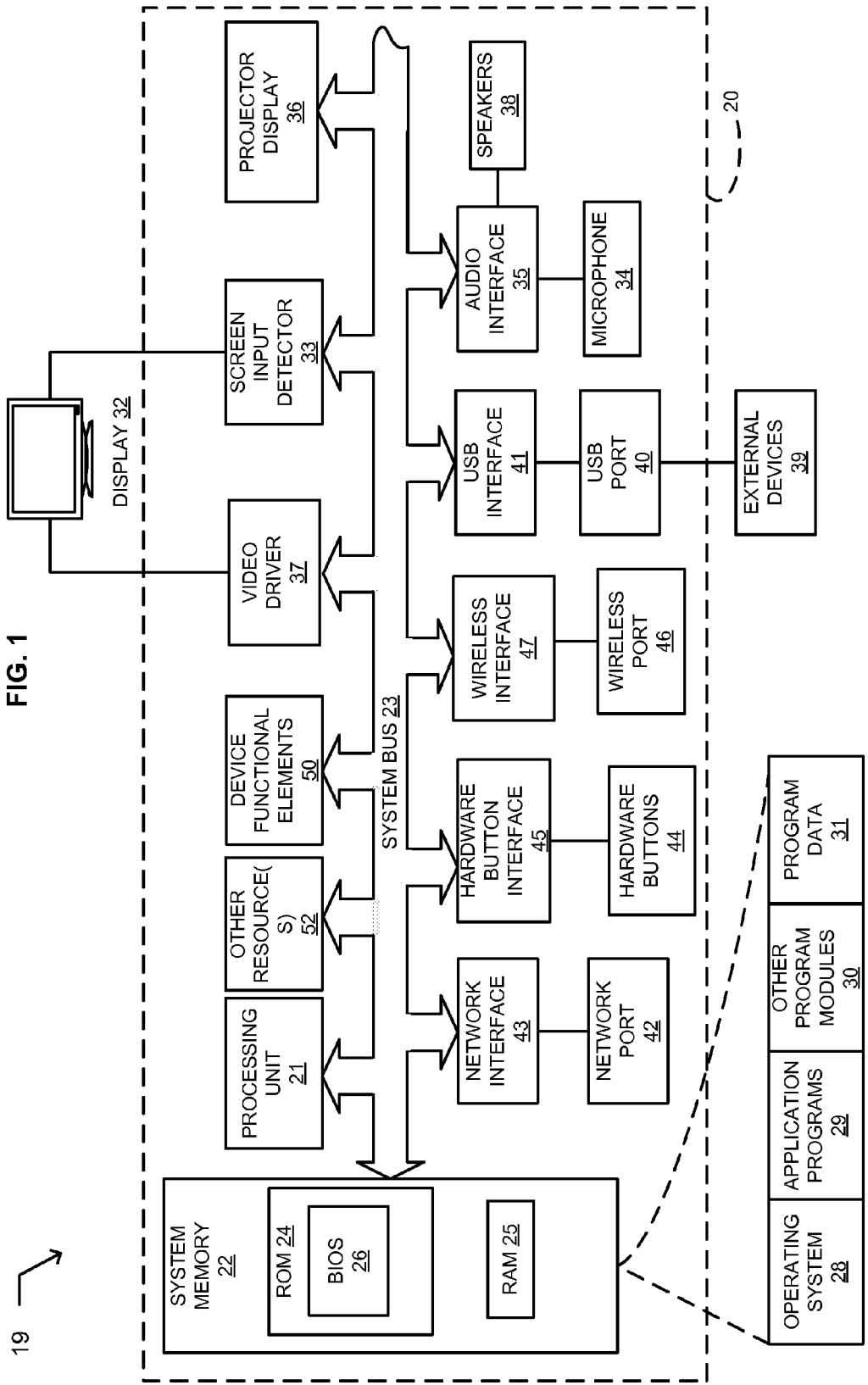
FIG. 1 illustrates an example embodiment of an environment that includes a thin computing device in which embodiments may be implemented.

In the following detailed description, reference is made to the accompanying drawings, which form a part hereof. In the drawings, similar symbols typically identify similar components, unless context dictates otherwise. The illustrated embodiments described in the detailed description, drawings, and claims are not meant to be limiting. Other embodiments may be utilized, and other changes may be made, without departing from the spirit or scope of the subject matter presented here.

This application makes reference to technologies described more fully in U.S. patent application Ser. No. 14/460,088, filed on even date herewith, and entitled "VEHICLE COLLISION MANAGEMENT RESPONSIVE TO TRACTION CONDITIONS IN AN AVOIDANCE PATH." That application is incorporated by reference herein, including any subject matter included by reference in that application.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various implementations by which processes and/or systems and/or other technologies described herein can be effected (e.g., hardware, software, and/or firmware), and that the preferred implementation will vary with the context in which the processes and/or systems and/or other technologies are deployed. For example, if an implementer determines that speed and accuracy are paramount, the implementer may opt for a mainly hardware and/or firmware implementation; alternatively, if flexibility is paramount, the implementer may opt for a mainly software implementation; or, yet again alternatively, the implementer may opt for some combination of hardware, software, and/or firmware. Hence, there are several possible implementations by which the processes and/or devices and/or other technologies described herein may be effected, none of which is inherently superior to the other in that any implementation to be utilized is a choice dependent upon the context in which the implementation will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures suitable to implement an operation. Electronic circuitry, for example, may manifest one or more paths of electrical current constructed and arranged to implement various logic functions as described herein. In some implementations, one or more media are configured to bear a device-detectable implementation if such media hold or transmit a special-purpose device instruction set operable to perform as described herein. In some variants, for example, this may manifest as an update or other modification of existing software or firmware, or of gate arrays or other programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or otherwise invoking circuitry for enabling, triggering, coordinating, requesting, or otherwise causing one or more occurrences of any functional operations described below. In some variants, operational or other logical descriptions herein may be expressed directly as source code and compiled or otherwise invoked as an executable instruction sequence. In some contexts, for example, C++ or other code sequences can be compiled directly or otherwise implemented in high-level descriptor languages (e.g., a logic-synthesizable language, a hardware description language, a hardware design simulation, and/or other such similar mode(s) of expression). Alternatively or additionally, some or all of the logical expression may be manifested as a Verilog-type hardware description or other circuitry model before physical implementation in hardware, especially for basic operations or timing-critical applications. Those skilled in the art will recognize how to obtain, configure, and optimize suitable transmission or computational elements, material supplies, actuators, or other common structures in light of these teachings.

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof and a wide range of components that may impart mechanical force or motion such as rigid bodies, spring or torsional bodies, hydraulics, electromagnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, module, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will also recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will further recognize that at least a portion of the devices and/or processes described herein can be integrated into an image processing system. A typical image processing system may generally include one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch-sensitive screen or display surface, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will likewise recognize that at least some of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch-sensitive screen or display surface, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Figure 2:
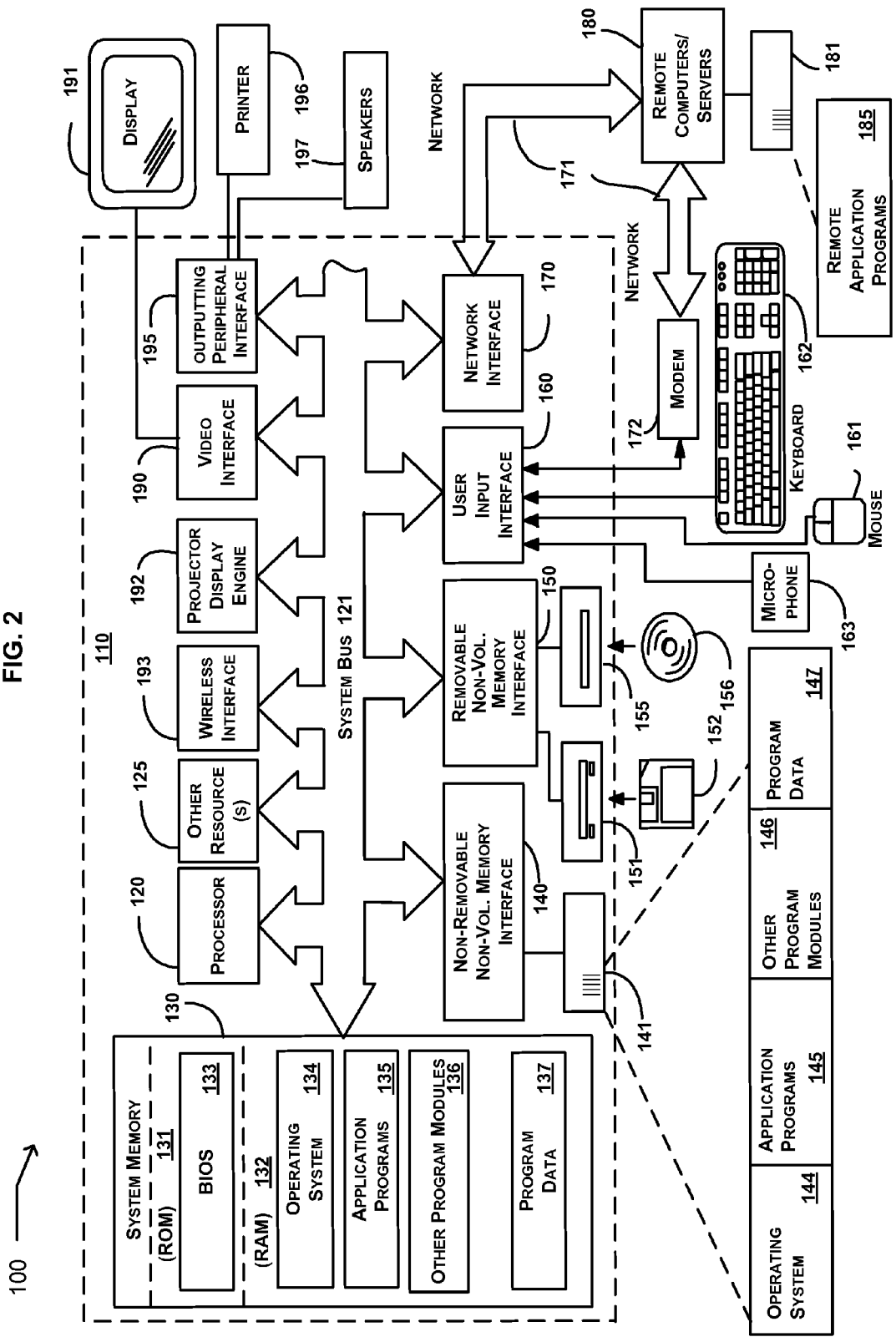
FIG. 2 illustrates an example embodiment of an environment that includes a general-purpose computing system in which embodiments may be implemented.

FIGS. 1 and 2 provide respective general descriptions of several environments in which implementations may be implemented. FIG. 1 is generally directed toward a thin computing environment 19 having a thin computing device 20, and FIG. 2 is generally directed toward a general purpose computing environment 100 having general purpose computing device 110. However, as prices of computer components drop and as capacity and speeds increase, there is not always a bright line between a thin computing device and a general purpose computing device. Further, there is a continuous stream of new ideas and applications for environments benefited by use of computing power. As a result, nothing should be construed to limit disclosed subject matter herein to a specific computing environment unless limited by express language.

FIG. 1 and the following discussion are intended to provide a brief, general description of a thin computing environment 19 in which embodiments may be implemented. FIG. 1 illustrates an example system that includes a thin computing device 20, which may be included or embedded in an electronic device that also includes a device functional element 50. For example, the electronic device may include any item having electrical or electronic components playing a role in a functionality of the item, such as for example, a refrigerator, a car, a digital image acquisition device, a camera, a cable modem, a printer an ultrasound device, an x-ray machine, a non-invasive imaging device, or an airplane. For example, the electronic device may include any item that interfaces with or controls a functional element of the item. In another example, the thin computing device may be included in an implantable medical apparatus or device. In a further example, the thin computing device may be operable to communicate with an implantable or implanted medical apparatus. For example, a thin computing device may include a computing device having limited resources or limited processing capability, such as a limited resource computing device, a wireless communication device, a mobile wireless communication device, a smart phone, an electronic pen, a handheld electronic writing device, a scanner, a cell phone, a smart phone (such as an Android® or iPhone® based device), a tablet device (such as an iPad®) or a Blackberry® device. For example, a thin computing device may include a thin client device or a mobile thin client device, such as a smart phone, tablet, notebook, or desktop hardware configured to function in a virtualized environment.

The thin computing device 20 includes a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that help to transfer information between sub-components within the thin computing device 20, such as during start-up, is stored in the ROM 24. A number of program modules may be stored in the ROM 24 or RAM 25, including an operating system 28, one or more application programs 29, other program modules 30 and program data 31.

A user may enter commands and information into the computing device 20 through one or more input interfaces. An input interface may include a touch-sensitive screen or display surface, or one or more switches or buttons with suitable input detection circuitry. A touch-sensitive screen or display surface is illustrated as a touch-sensitive display 32 and screen input detector 33. One or more switches or buttons are illustrated as hardware buttons 44 connected to the system via a hardware button interface 45. The output circuitry of the touch-sensitive display 32 is connected to the system bus 23 via a video driver 37. Other input devices may include a microphone 34 connected through a suitable audio interface 35, or a physical hardware keyboard (not shown). Output devices may include the display 32, or a projector display 36.

In addition to the display 32, the computing device 20 may include other peripheral output devices, such as at least one speaker 38. Other external input or output devices 39, such as a joystick, game pad, satellite dish, scanner or the like may be connected to the processing unit 21 through a USB port 40 and USB port interface 41, to the system bus 23. Alternatively, the other external input and output devices 39 may be connected by other interfaces, such as a parallel port, game port or other port. The computing device 20 may further include or be capable of connecting to a flash card memory (not shown) through an appropriate connection port (not shown). The computing device 20 may further include or be capable of connecting with a network through a network port 42 and network interface 43, and through wireless port 46 and corresponding wireless interface 47 may be provided to facilitate communication with other peripheral devices, including other computers, printers, and so on (not shown). It will be appreciated that the various components and connections shown are examples and other components and means of establishing communication links may be used.

The computing device 20 may be primarily designed to include a user interface. The user interface may include a character, a key-based, or another user data input via the touch sensitive display 32. The user interface may include using a stylus (not shown). Moreover, the user interface is not limited to an actual touch-sensitive panel arranged for directly receiving input, but may alternatively or in addition respond to another input device such as the microphone 34. For example, spoken words may be received at the microphone 34 and recognized. Alternatively, the computing device 20 may be designed to include a user interface having a physical keyboard (not shown).

The device functional elements 50 are typically application specific and related to a function of the electronic device, and are coupled with the system bus 23 through an interface (not shown). The functional elements may typically perform a single well-defined task with little or no user configuration or setup, such as a refrigerator keeping food cold, a cell phone connecting with an appropriate tower and transceiving voice or data information, a camera capturing and saving an image, or communicating with an implantable medical apparatus.

In certain instances, one or more elements of the thin computing device 20 may be deemed not necessary and omitted. In other instances, one or more other elements may be deemed necessary and added to the thin computing device.

FIG. 2 and the following discussion are intended to provide a brief, general description of an environment in which embodiments may be implemented. FIG. 2 illustrates an example embodiment of a general-purpose computing system in which embodiments may be implemented, shown as a computing system environment 100. Components of the computing system environment 100 may include, but are not limited to, a general purpose computing device 110 having a processor 120, a system memory 130, and a system bus 121 that couples various system components including the system memory to the processor 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computing system environment 100 typically includes a variety of computer-readable media products. Computer-readable media may include any media that can be accessed by the computing device 110 and include both volatile and nonvolatile media, removable and non-removable media. By way of example, and not of limitation, computer-readable media may include computer storage media. By way of further example, and not of limitation, computer-readable media may include a communication media.

Computer storage media includes volatile and nonvolatile, removable and non-removable media implemented in any method or technology for storage of information such as computer-readable instructions, data structures, program modules, or other data. Computer storage media includes, but is not limited to, random-access memory (RAM), read-only memory (ROM), electrically erasable programmable read-only memory (EEPROM), flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computing device 110. In a further embodiment, a computer storage media may include a group of computer storage media devices. In another embodiment, a computer storage media may include an information store. In another embodiment, an information store may include a quantum memory, a photonic quantum memory, or atomic quantum memory. Combinations of any of the above may also be included within the scope of computer-readable media.

Communication media may typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media may include wired media, such as a wired network and a direct-wired connection, and wireless media such as acoustic, RF, optical, and infrared media.

The system memory 130 includes computer storage media in the form of volatile and nonvolatile memory such as ROM 131 and RAM 132. A RAM may include at least one of a DRAM, an EDO DRAM, a SDRAM, a RDRAM, a VRAM, or a DDR DRAM. A basic input/output system (BIOS) 133, containing the basic routines that help to transfer information between elements within the computing device 110, such as during start-up, is typically stored in ROM 131. RAM 132 typically contains data and program modules that are immediately accessible to or presently being operated on by the processor 120. By way of example, and not limitation, FIG. 2 illustrates an operating system 134, application programs 135, other program modules 136, and program data 137. Often, the operating system 134 offers services to applications programs 135 by way of one or more application programming interfaces (APIs) (not shown). Because the operating system 134 incorporates these services, developers of applications programs 135 need not redevelop code to use the services. Examples of APIs provided by operating systems such as Microsoft's "WINDOWS"® are well known in the art.

The computing device 110 may also include other removable/non-removable, volatile/nonvolatile computer storage media products. By way of example only, FIG. 2 illustrates a non-removable non-volatile memory interface (hard disk interface) 140 that reads from and writes for example to non-removable, non-volatile magnetic media. FIG. 2 also illustrates a removable non-volatile memory interface 150 that, for example, is coupled to a magnetic disk drive 151 that reads from and writes to a removable, non-volatile magnetic disk 152, or is coupled to an optical disk drive 155 that reads from and writes to a removable, non-volatile optical disk 156, such as a CD ROM. Other removable/non-removable, volatile/non-volatile computer storage media that can be used in the example operating environment include, but are not limited to, magnetic tape cassettes, memory cards, flash memory cards, DVDs, digital video tape, solid state RAM, and solid state ROM. The hard disk drive 141 is typically connected to the system bus 121 through a non-removable memory interface, such as the interface 140, and magnetic disk drive 151 and optical disk drive 155 are typically connected to the system bus 121 by a removable non-volatile memory interface, such as interface 150.

The drives and their associated computer storage media discussed above and illustrated in FIG. 2 provide storage of computer-readable instructions, data structures, program modules, and other data for the computing device 110. In FIG. 2, for example, hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that, at a minimum, they are different copies.

A user may enter commands and information into the computing device 110 through input devices such as a microphone 163, keyboard 162, and pointing device 161, commonly referred to as a mouse, trackball, or touch pad. Other input devices (not shown) may include at least one of a touch-sensitive screen or display surface, joystick, game pad, satellite dish, and scanner. These and other input devices are often connected to the processor 120 through a user input interface 160 that is coupled to the system bus, but may be connected by other interface and bus structures, such as a parallel port, game port, or a universal serial bus (USB).

A display 191, such as a monitor or other type of display device or surface may be connected to the system bus 121 via an interface, such as a video interface 190. A projector display engine 192 that includes a projecting element may be coupled to the system bus. In addition to the display, the computing device 110 may also include other peripheral output devices such as speakers 197 and printer 196, which may be connected through an output peripheral interface 195.

The computing system environment 100 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computing device 110, although only a memory storage device 181 has been illustrated in FIG. 2. The network logical connections depicted in FIG. 2 include a local area network (LAN) and a wide area network (WAN), and may also include other networks such as a personal area network (PAN) (not shown). Such networking environments are commonplace in offices, enterprise-wide computer networks, intranets, and the Internet.

When used in a networking environment, the computing system environment 100 is connected to the network 171 through a network interface, such as the network interface 170, the modem 172, or the wireless interface 193. The network may include a LAN network environment, or a WAN network environment, such as the Internet. In a networked environment, program modules depicted relative to the computing device 110, or portions thereof, may be stored in a remote memory storage device. By way of example, and not limitation, FIG. 2 illustrates remote application programs 185 as residing on memory storage device 181. It will be appreciated that the network connections shown are examples and other means of establishing a communication link between the computers may be used.

In certain instances, one or more elements of the computing device 110 may be deemed not necessary and omitted. In other instances, one or more other elements may be deemed necessary and added to the computing device.

Figure 3:
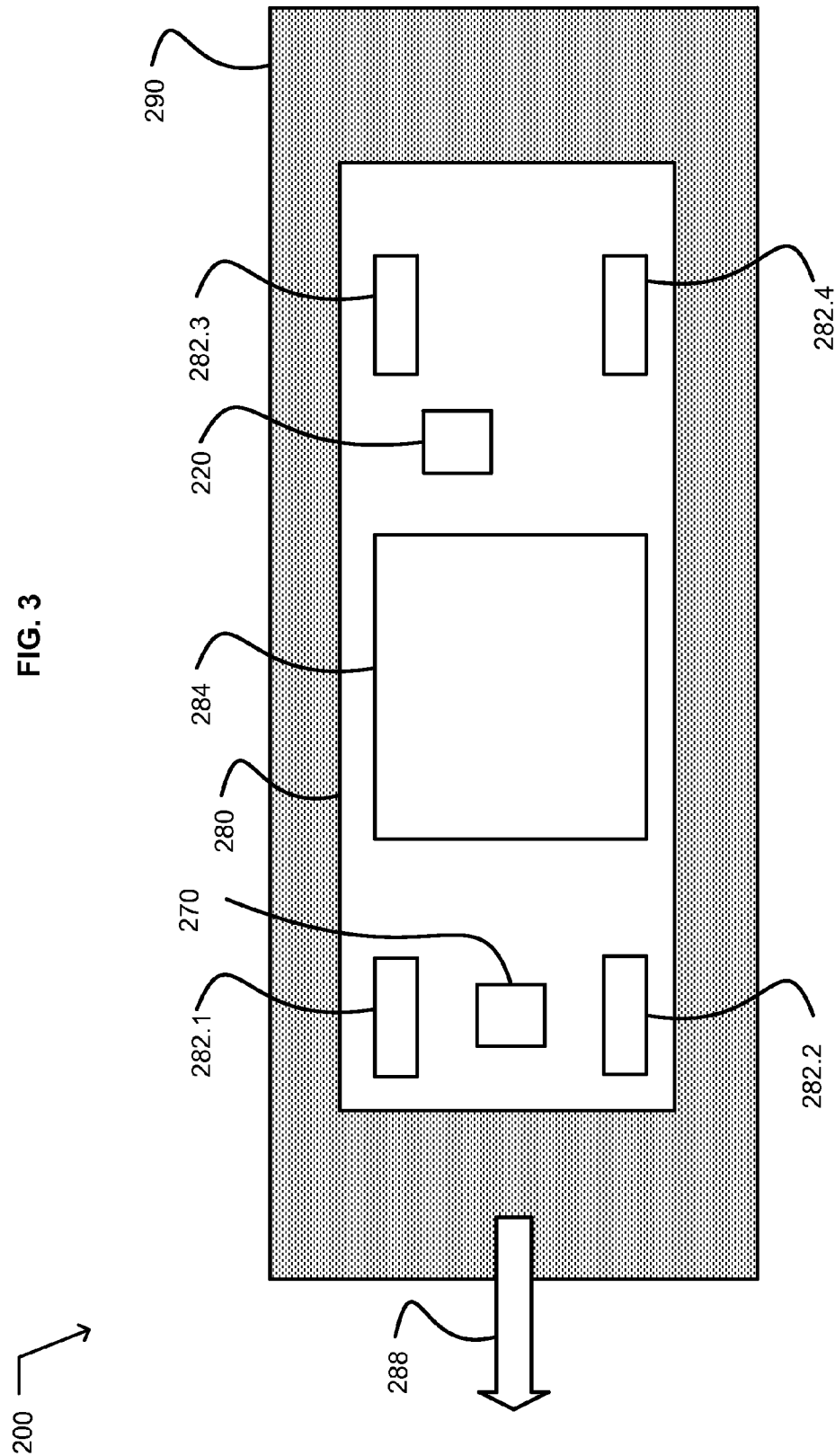
FIG. 3 schematically illustrates a plan view of an example environment in which embodiments may be implemented.
Figure 4:
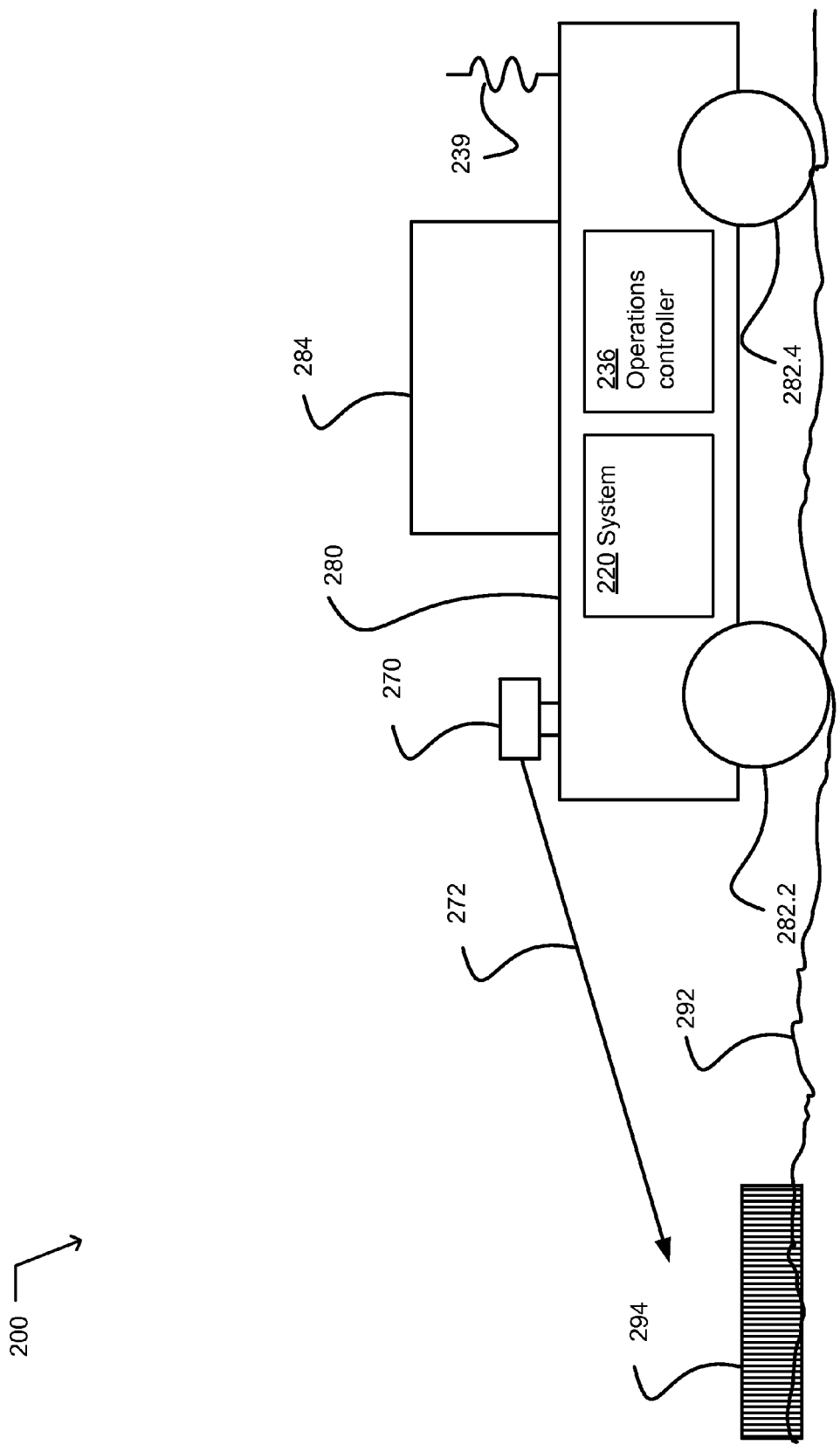
FIG. 4 schematically illustrates a side view of the example environment of FIG. 3.

FIGS. 3 and 4 schematically illustrate an example environment 200 in which embodiments may be implemented. FIG. 3 includes a plan view and FIG. 4 includes a side view. The environment includes a vehicle 280 traveling in a direction 288 across a surface 290, such as a paved road having an aggregate surface or other surface defining a driving surface. In an embodiment, the vehicle includes front wheels 282.1 and 282.2, rear wheels 282.3 and 282.4, and a passenger compartment 284. FIG. 4 illustrates a portion 294 of a surface of a possible collision avoidance path 292. Also illustrated is a system 220.

Figure 5:
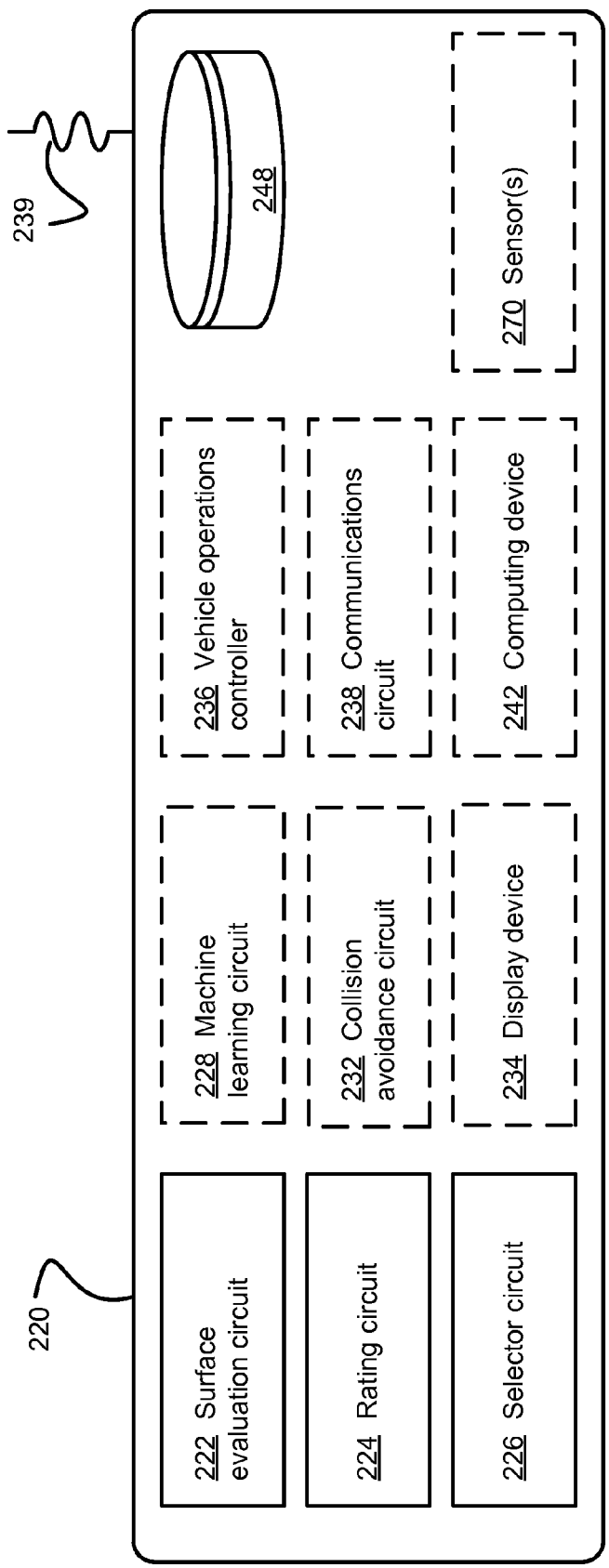
FIG. 5 schematically illustrates an embodiment of the system of FIGS. 3 and 4.

FIG. 5 schematically illustrates an embodiment of the system 220 of FIGS. 3 and 4. The system includes a surface evaluation circuit 222 configured to determine a surface traction characteristic of at least the portion 294 of the surface of the possible collision avoidance path 292 of the vehicle 280. For example, the possible collision avoidance path may be generated by a collision avoidance circuit 232. For example, the surface traction characteristic may be responsive to surface data of the driving surface acquired by an on-board sensor 270 scanning 272 one or more portions of the surface of the possible collision avoidance path. The system includes a rating circuit 224 configured to assign a risk value to the possible collision avoidance path responsive to the determined surface traction characteristic. For example, a risk value of zero may be assigned to a surface of a relatively new and well-constructed asphalt road surface, a risk value of one may be assigned to a worn or alligatored asphalt road surface, a risk value of two may be assigned to a compacted dirt surface, a risk value of three may be assigned to a potholed or sloping away surface, and a risk value of four assigned to a snow or ice covered surface. The system includes a selector circuit 226 having a rule-set configured to select a collision avoidance path from at least two possible collision avoidance paths. The rule-set is responsive to an evaluation of the respective assigned risk value for each of the at least two possible collision avoidance paths. In an embodiment, the rule set is responsive to an evaluation of the respective assigned risk value for each of the at least two possible collision avoidance paths. In an embodiment, the surface traction characteristic includes a surface characteristic that affects a handling characteristic of the vehicle 280. For example, the surface traction characteristic may include a surface traction coefficient. For example, the surface traction characteristic may be nonlinear, such a function of or depending on vehicle speed, contact time, or the like. For example, the surface traction characteristic may affect longitudinal or lateral traction.

In an embodiment, the portion of the driving surface 292 includes a degraded driving surface. For example, the portion of the driving surface may include a shoulder, ditch, or potholed surface. In an embodiment, the degraded driving surface includes a surface degraded by a presence of water, marsh, brush, rock, sand, dirt, grass, or snow. For example, the degraded driving surface may have a different/degraded traction compared to normal road, or present a resistance to a wheel of the vehicle. In an embodiment, the degraded driving surface includes a surface not reasonably expected to support a wheel of the vehicle. In an embodiment, the portion of the driving surface includes an on-road or off-road portion of the driving surface. In an embodiment, the surface traction characteristic is determined in response to data indicative of a condition of the at least a portion of the surface. For example, a condition may include dirt, rain, mud, ice, or weather condition. For example, a condition may include a surface change or a transition from one surface to another. For example, the at least a portion of the potential path may involve one or more of wheels of the vehicle being off-road. In an embodiment, the surface traction characteristic includes a combination of a first surface traction characteristic of a portion of a driving surface of a possible collision avoidance path likely to be traversed by a first wheel of the vehicle and a second surface traction characteristic of the portion of the driving surface likely to be traversed by a second wheel of the vehicle.

In an embodiment, the data indicative of a condition of at least a portion of the surface is acquired by the sensor 270 carried on-board the vehicle 280. In an embodiment, the possible collision avoidance path includes a possible collision avoidance path where at least one wheel of the vehicle is off-road during at least a portion of the collision avoidance path.

In an embodiment, the assigned risk value is based upon a capability of the vehicle 280 to respond to the determined surface traction characteristic. For example, the capability of the vehicle may include anticipated handling ability or capability of the vehicle to follow or implement the possible collision avoidance path. For example, an anticipated handling ability or capability of the vehicle may include all-wheel drive, suitable tires, or a sophistication of its vehicle control system. In an embodiment, the assigned risk value is responsive to a capability of the vehicle to respond to the determined surface traction characteristic in view of the vehicle's existing speed or existing weather conditions. In an embodiment, the assigned risk value is responsive to a machine-learned capability of the vehicle to respond to the determined surface traction characteristic. For example, the machine learning may be implemented by a machine learning circuit 228. For example, the machine learning circuit may include a learning algorithm or system configured to take into account worn tires or shocks, or load carried by vehicle. In an embodiment, the rule-set is structured to select the collision path having the lowest risk value. In an embodiment, the rule set is responsive to a comparison of the respective assigned risk value for each of the at least two possible collision avoidance paths.

In an embodiment, the system 220 includes the collision avoidance circuit 232 configured to generate a collision avoidance instruction responsive to the selected collision avoidance path. In an embodiment, the collision avoidance circuit is further configured to generate at least two possible collision avoidance paths of the vehicle 280 responsive to data indicative of an environment or situation indicating a possible collision threat. For example, United States Pat. App. Pub 2010/0228427, Anderson et al., describes predicting a vehicle trajectory. In an embodiment, the system includes a display device 234 configured to display a human perceivable presentation of an aspect of the selected collision avoidance path. In an embodiment, the system includes a vehicle operations controller 236 configured to initiate an implementation of an aspect of the selected collision avoidance path by a control system of the vehicle. In an embodiment, the vehicle operations controller includes a steering controller of the vehicle. In an embodiment, the vehicle operations controller includes a braking controller of the vehicle. In an embodiment, the vehicle operations controller includes a throttle controller of the vehicle. In an embodiment, the vehicle operations controller is further configured to initiate an implementation of an aspect of the selected collision avoidance path by the vehicle by preparing for the surface traction characteristic ahead of the selection of the collision avoidance path. For example, a preparing may include setting a wheel angle, set a speed of the vehicle, or adjusting a suspension component of the vehicle.

In an embodiment, the system 220 includes a communication circuit 238 configured to output a signal indicative of the selected collision avoidance path. In an embodiment, the communication circuit includes a wireless communication circuit 239. In an embodiment, the system includes a sensor 270 configured to acquire the data indicative of the condition of a portion 294 of the surface of the possible collision avoidance path 292. For example, United States Pat. App. Pub. 2013/0103259, Howe et al., describes receiving road information from vehicle carried vision system. In an embodiment, the sensor is configured to be mounted on the vehicle. In an embodiment, the system includes another sensor configured to acquire data indicative of an environment or situation external to the collision-managed vehicle. In an embodiment, the another sensor is configured to be mounted on the vehicle. In an embodiment, the system includes a computer readable storage media 248 configured to save the selected collision avoidance path. In an embodiment, the system 220 includes a computing device 242. In an embodiment, the device may include the thin computing device 20 illustrated in the computing environment 19 described in conjunction with FIG. 1. In an embodiment, the device may include the general purpose computing device 110 described in conjunction with the general purpose computing environment 100.

FIGS. 3-5 illustrate an alternative embodiment of the vehicle 280. In the alternative embodiment, the vehicle includes a chassis, at least two wheels, a propulsion system, and a body. In an embodiment, the vehicle 280 includes a terrestrial vehicle. For example, a terrestrial vehicle may include a car or a truck. The vehicle includes the surface evaluation circuit 222 configured to determine a surface traction characteristic of at least a portion 294 of a driving surface of a possible collision avoidance path 292 of the vehicle. The vehicle includes the rating circuit 224 configured to assign a risk value to the possible collision avoidance path responsive to the determined surface traction characteristic. The vehicle includes the selector circuit 226 having a rule-set configured to select a collision avoidance path from at least two possible collision avoidance paths. The rule-set is responsive to an evaluation of a respective assigned risk value for each of the at least two possible collision avoidance paths.

In an embodiment, the vehicle 280 includes the vehicle operations controller 236 configured to initiate an implementation of an aspect of the selected collision avoidance path by a control system of the vehicle. In an embodiment, the vehicle includes the display device 234 configured to display a human perceivable presentation of an aspect of the selected collision avoidance path. In an embodiment, the vehicle includes a computing device 242.

FIGS. 4 and 5 also illustrate an alternative embodiment of the system 220. In the alternative embodiment, the system includes the sensor 270 configured to detect a first surface traction characteristic of a possible path of the vehicle 280 and provide a first sensor signal representative of the first surface traction characteristic. In the alternative embodiment, the system includes a decision circuit configured to receive the first sensor signal. The decision circuit is configured to determine, based on the first sensor signal and a calculated risk, whether to provide a path deviation signal. The path deviation signal including information representative of risk to staying on the possible path of the vehicle.

Figure 6:
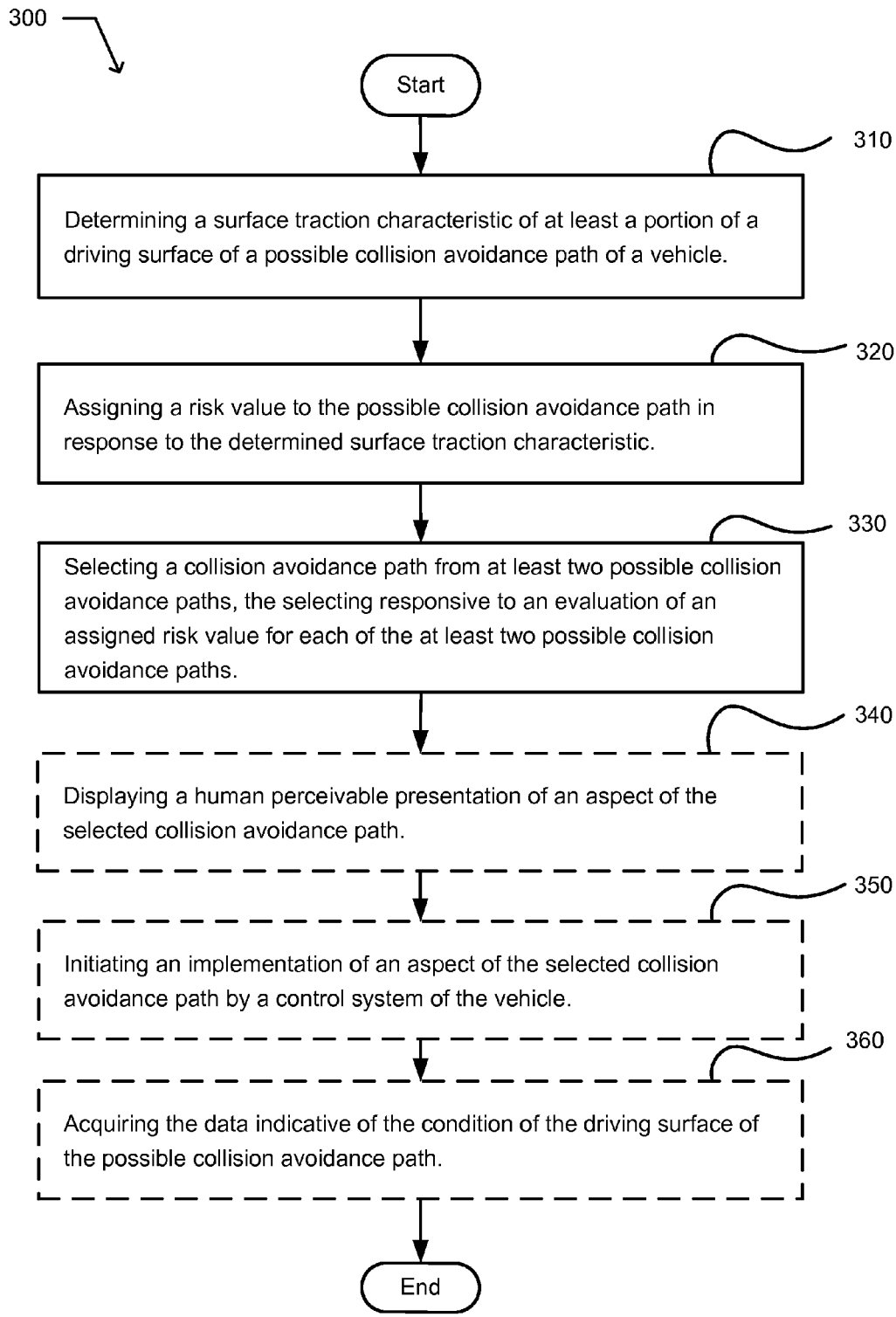
FIG. 6 illustrates an example operational flow.

FIG. 6 illustrates an example operational flow 300. After a start operation, the operational flow includes an evaluation operation 310. The evaluation operation includes determining a surface traction characteristic of at least a portion of a driving surface of a possible collision avoidance path of a vehicle. In an embodiment, the evaluation operation may be implemented using the surface evaluation circuit 222 described in conjunction with FIG. 5. A rating operation 320 includes assigning a risk value to the possible collision avoidance path in response to the determined surface traction characteristic. In an embodiment, the rating operation may be implemented using the rating circuit 224 described in conjunction with FIG. 5. A choosing operation 330 includes selecting a collision avoidance path from at least two possible collision avoidance paths, the selecting responsive to an evaluation of an assigned risk value for each of the at least two possible collision avoidance paths. In an embodiment, the choosing operation may be implemented using the selector circuit 226 described in conjunction with FIG. 5. The operational flow includes an end operation.

In an embodiment, the operational flow 300 includes an operation 340 displaying a human perceivable presentation of an aspect of the selected collision avoidance path. In an embodiment, the operational flow includes an operation 350 initiating an implementation of an aspect of the selected collision avoidance path by a control system of the vehicle. In an embodiment, the operational flow includes an operation 360 acquiring the data indicative of the condition of the driving surface of the possible collision avoidance path. In an embodiment, the operational flow includes outputting the selected collision avoidance path. For example, the selected collision avoidance path may be outputted to the vehicle operations controller 236 or the display device 234. For example, the selected collision avoidance path may be outputted to and stored by the computer readable storage media 248, or may be wirelessly communicated 239 to another device or system.

Figure 7:
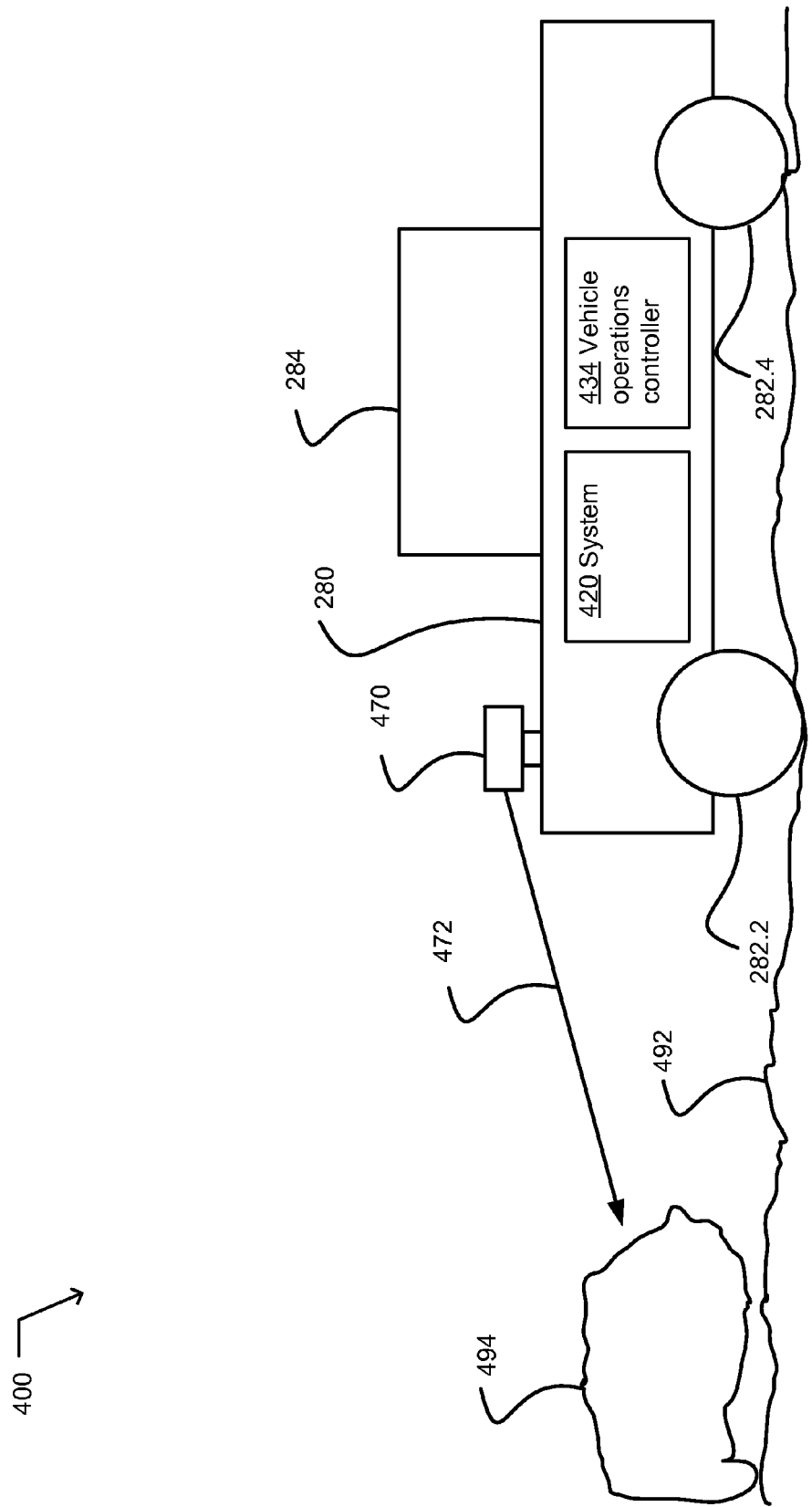
FIG. 7 illustrates an adverse circumstance present in a possible collision avoidance path of a vehicle.
Figure 8:
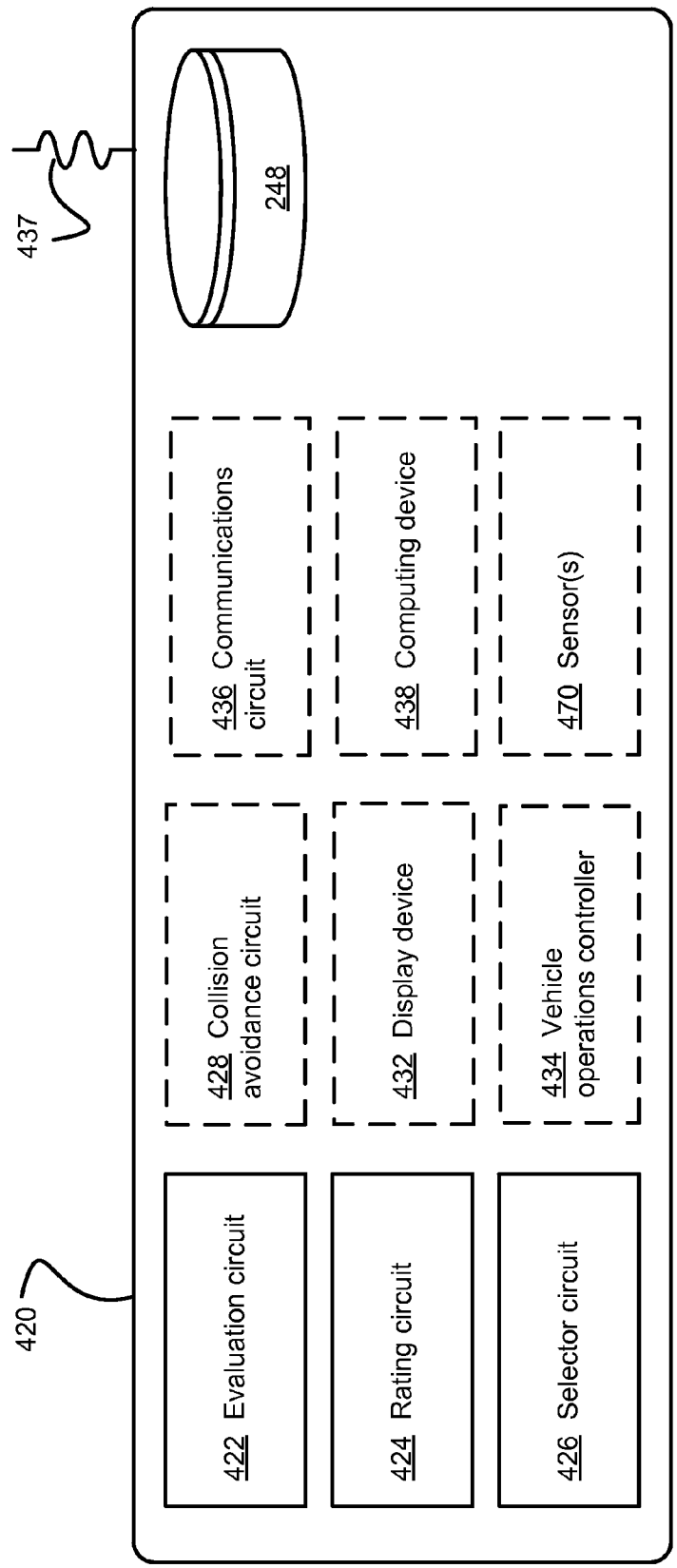
FIG. 8 schematically illustrates an embodiment of the system of the vehicle of FIG. 7.

FIGS. 7 and 8 schematically illustrate an environment 400 in which embodiments may be implemented, and which includes the vehicle 280 of FIG. 3. FIG. 3 includes a plan view of the vehicle 280 and FIG. 4 includes a side view of the vehicle in the environment 400. The environment includes the vehicle 280 traveling in the direction 288 across the surface 290, such as a paved road having an aggregate surface or other surface defining a driving surface. In an embodiment, the vehicle includes front wheels 282.1 and 282.2, rear wheels 282.3 and 282.4, and a passenger compartment 284.

FIG. 7 illustrates an adverse circumstance 494 present in a possible collision avoidance path 492 of the vehicle 280. Also illustrated is a system 420. FIG. 8 schematically illustrates an embodiment of the system. The system includes an evaluation circuit 422 configured to determine a characteristic of the adverse circumstance present in a possible collision avoidance path 472 of the vehicle. For example, the possible collision avoidance path may be generated by a collision avoidance circuit 428. The system includes a rating circuit 424 configured to assign a risk value to the possible collision avoidance path responsive to the determined characteristic of the adverse circumstance. The system includes a selector circuit 426. The selector circuit includes a rule-set structured to select a collision avoidance path from at least two possible collision avoidance paths in response to an evaluation of a respective assigned risk value for each of the at least two possible collision avoidance paths.

In an embodiment, the characteristic of an adverse circumstance includes a characteristic of another vehicle present in the possible collision avoidance path 492. In an embodiment, the characteristic of the another vehicle includes at least one of a size, weight, location, speed, or behavior of the other vehicle. In an embodiment, the characteristic of the another vehicle includes a predicted consequence of a collision between the vehicle and the another vehicle. In an embodiment, the characteristic of an adverse circumstance includes a characteristic of at least a portion of an adverse driving surface of the possible collision avoidance path. For example, the characteristic of the adverse driving surface may include ice, potholes, or a cliff. In an embodiment, the characteristic of an adverse circumstance includes a characteristic of an adverse object present in the possible collision avoidance path. For example, the adverse object may include an adverse object impeding or obstructing the possible collision avoidance path. For example, the adverse object may be a static or a moving adverse object. In an embodiment, the characteristic of an adverse circumstance includes a characteristic of an adverse situation present in the possible collision avoidance path. In an embodiment, the adverse circumstance includes a circumstance adverse to the vehicle successfully transiting the possible collision avoidance path. In an embodiment, the characteristic of an adverse circumstance includes a characteristic of an adverse condition present in the possible collision avoidance path. In an embodiment, the characteristic of an adverse circumstance is determined in response to data indicative of the adverse circumstance present in the possible collision avoidance path of the vehicle.

In an embodiment, the risk value is assigned based upon a capability of the vehicle 280 to travel the possible collision avoidance path 492. For example, a capability of the vehicle may include a handling capability of its suspension, tires, or brakes to successfully or safely travel the possible collision avoidance path. For example, the handling capability may be learned or modified by a machine-learning circuit, such as the machine learning circuit 228 described in conjunction with FIG. 5, or may be provided by the vehicle manufacturer. In an embodiment, the rating circuit 424 is further configured to assign an uncertainty to the assigned risk value of the possible collision path. In an embodiment, the assigned uncertainty is responsive to a confidence level in the assigned risk value. In an embodiment, the assigned uncertainty is responsive to a range of reasonable confidence levels in the assigned risk value. For example, a range of reasonable confidence levels for a particular risk value may be between 20% and 80%. In an embodiment, the assigned uncertainty is responsive to a three-point estimation technique. For example, a three-point estimation technique may include a best-case estimate, a most likely estimate, and a worst-case estimate. In an embodiment, the assigned uncertainty includes a risk probability distribution. For example, the risk probability value R(0.30) indicates that there is a 30% confidence that the risk factor is less than R(0.30); likewise the risk probability value R(0.90) indicates that there is a 90% confidence that the risk factor is less than R(0.90). It should be appreciated that in some situations, the assigned risk probability values may not accurately reflect reality, but simply reflect the confidence currently (and perhaps inaccurately) held by the rating circuit in various risk values.

In an embodiment, the selector circuit 426 includes a rule-set structured to select a collision avoidance path from at least two possible collision avoidance paths. The selection is responsive to an evaluation of a respective assigned risk value and an assigned uncertainty for each of the at least two possible collision avoidance paths. In an embodiment, the selector circuit includes a rule-set structured to select a collision avoidance path from at least two possible collision avoidance paths. The selection is in response to an evaluation of a respective assigned risk value for each of the at least two possible collision avoidance paths—wherein a first assigned risk value for a first possible collision avoidance path is responsive to a first type of adverse circumstance and a second assigned risk value for a second possible collision avoidance path is responsive to a second type of adverse circumstance. For example, the first risk value may be assigned to an icy driving surface circumstance in the first possible collision avoidance path and the second risk value may be assigned to a parked car circumstance in the second possible collision avoidance path. In an embodiment, the selector circuit includes a rule-set structured to select the collision avoidance path having the lowest risk value from at least two possible collision avoidance paths. In an embodiment, the selector circuit includes a rule-set structured to select the collision avoidance path having the lowest risk value for a selected uncertainty level from at least two possible collision avoidance paths. For example, the rule-set may select a collision avoidance path which has a higher average risk factor, but whose worst case risk factor is lower.

In an embodiment, the system 420 includes a collision avoidance circuit 428 configured to generate a collision avoidance instruction responsive to the selected collision avoidance path. In an embodiment, the system includes a collision avoidance circuit configured to generate at least two possible collision avoidance paths of the vehicle 280 responsive to an environment or situation indicating a possible collision threat. In an embodiment, the system includes a display device 432 configured to display a human perceivable presentation of an aspect of the selected collision avoidance path. In an embodiment, the system includes a vehicle operations controller 434 configured to initiate an implementation of an aspect of the selected collision avoidance path by a control system of the vehicle. In an embodiment, the system includes a sensor 470 configured to acquire data indicative of the adverse circumstance present in the possible collision avoidance path 492 of the vehicle. In an embodiment, the system includes another sensor configured to acquire data indicative of an environment or situation external to the vehicle. In an embodiment, the system includes a communication circuit 436 configured to output a signal indicative of the selected collision avoidance path. In an embodiment, the communication circuit includes a wireless communication circuit 437. In an embodiment, the system includes a computing device 438. In an embodiment, the device may include the thin computing device 20 illustrated in the computing environment 19 described in conjunction with FIG. 1. In an embodiment, the device may include the general purpose computing device 110 described in conjunction with the general purpose computing environment 100. In an embodiment, the system includes a computer readable storage media 448 configured to save the selected collision avoidance path.

Figure 9:
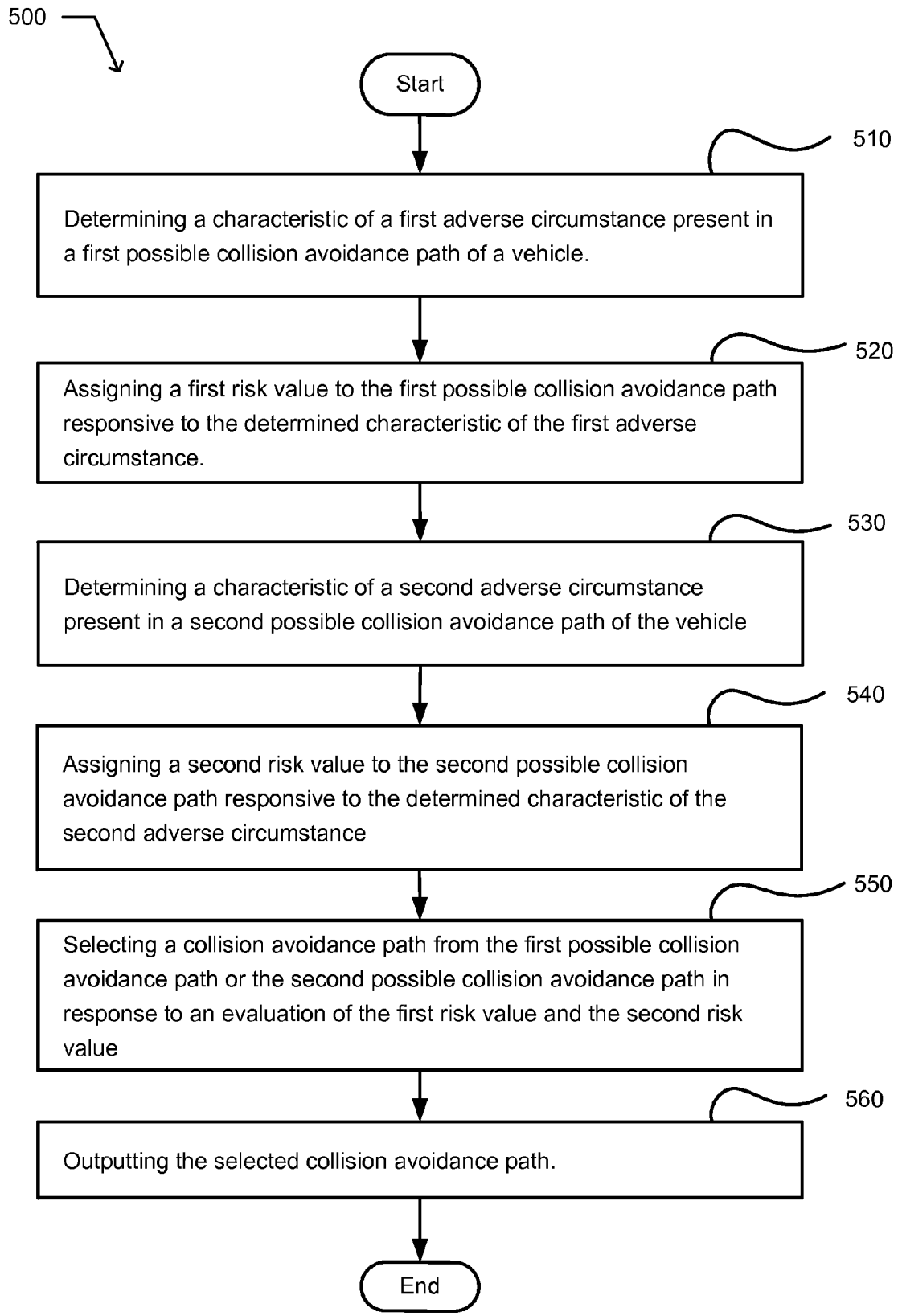
FIG. 9 illustrates an example operational flow.

FIG. 9 illustrates an example operational flow 500. After a start operation, the operational flow includes a first evaluation operation 510. The first evaluation operation includes determining a characteristic of a first adverse circumstance present in a first possible collision avoidance path of a vehicle. In an embodiment, the first evaluation operation may be implemented using the evaluation circuit 422 described in conjunction with FIG. 8. A first rating operation 520 includes assigning a first risk value to the first possible collision avoidance path responsive to the determined characteristic of the first adverse circumstance. In an embodiment, the first rating operation may be implemented using the rating circuit 424 described in conjunction with FIG. 8. A second evaluation operation 530 includes determining a characteristic of a second adverse circumstance present in a second possible collision avoidance path of the vehicle. In an embodiment, second evaluation operation may be implemented using the evaluation circuit 422 described in conjunction with FIG. 8. A second rating operation 540 includes assigning a second risk value to the second possible collision avoidance path responsive to the determined characteristic of the second adverse circumstance. In an embodiment, the second rating operation may be implemented using the rating circuit 424 described in conjunction with FIG. 8. A choosing operation 550 includes selecting a collision avoidance path from the first possible collision avoidance path or the second possible collision avoidance path in response to an evaluation of the first risk value and the second risk value. In an embodiment, the choosing operation may be implemented using the selector circuit 426 described in conjunction with FIG. 8. A communication operation 560 includes outputting the selected collision avoidance path. For example, the selected collision avoidance path may be outputted to the vehicle operations controller 434 or the display device 432. For example, the selected collision avoidance path may be outputted to and stored by the computer readable storage media 248, or may be communicated by the communications circuit 436 to another device or system. The operational flow includes an end operation. In an embodiment, the operational flow may be implemented in a computing device.

In an embodiment, the operational flow 400 includes generating a collision avoidance instruction responsive to the selected collision avoidance path. In an embodiment, the operational flow includes generating at least two possible collision avoidance paths of the vehicle responsive to an environment or situation indicating a possible collision threat. In an embodiment, the operational flow includes displaying a human perceivable presentation of an aspect of the selected collision avoidance path. In an embodiment, the operational flow initiating an implementation of an aspect of the selected collision avoidance path by a control system of the vehicle. In an embodiment, the operational flow includes acquiring data indicative of the first adverse circumstance present in the possible first collision avoidance path of the vehicle; and includes acquiring data indicative of the second adverse circumstance present in the possible second collision avoidance path of the vehicle. In an embodiment, the operational flow includes saving the selected collision avoidance path in a computer readable medium.

Figure 10:
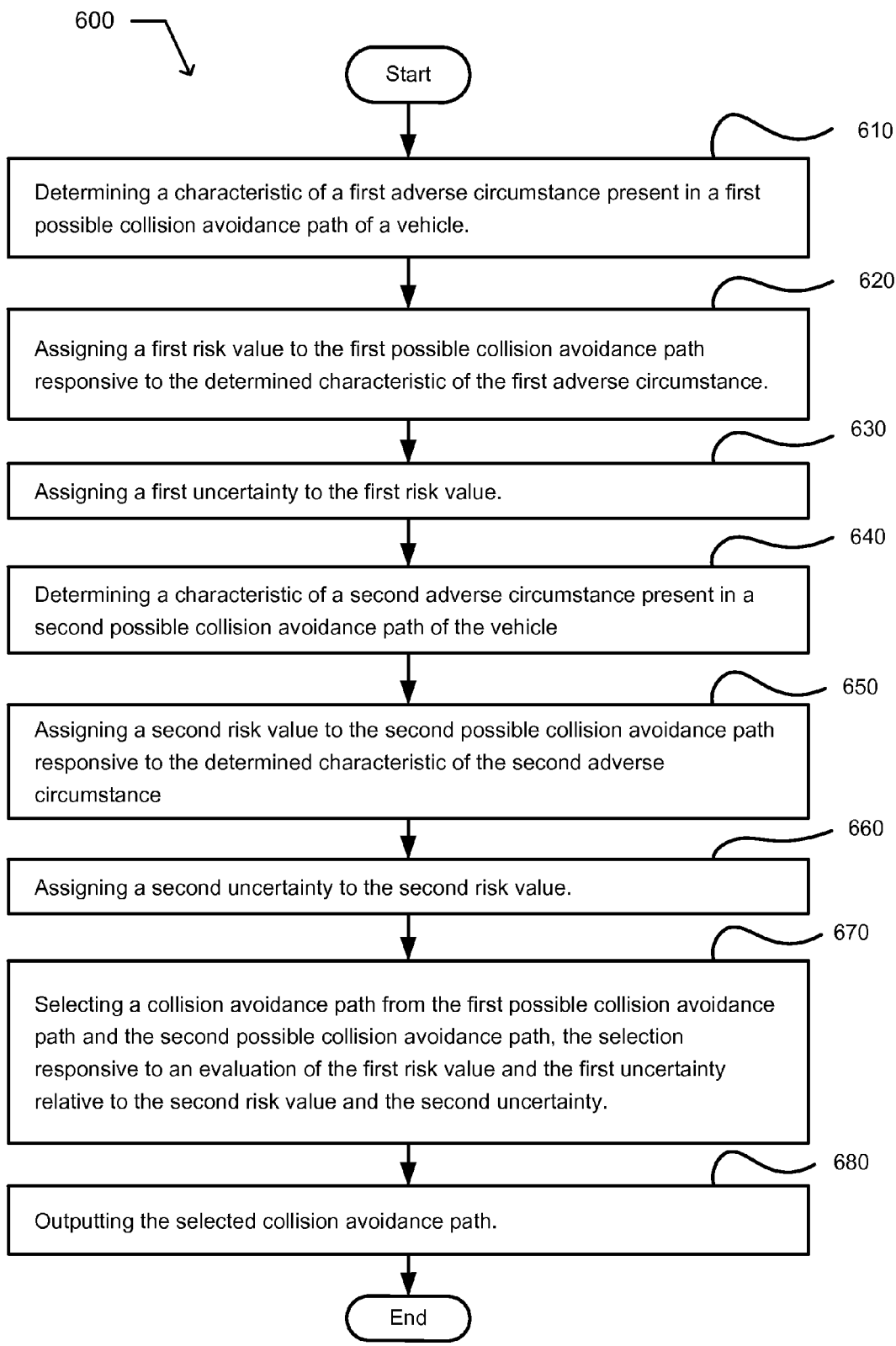
FIG. 10 illustrates an example operational flow.

FIG. 10 illustrates an example operational flow 600. After a start operation, the operational flow includes a first evaluation operation 610. The first evaluation operation includes determining a characteristic of a first adverse circumstance present in a first possible collision avoidance path of a vehicle. In an embodiment, the first evaluation operation may be implemented using the evaluation circuit 722 described in conjunction with FIG. 12. A first rating operation 620 includes assigning a first risk value to the first possible collision avoidance path responsive to the determined characteristic of the first adverse circumstance. In an embodiment, the first rating operation may be implemented using the rating circuit 724 described in conjunction with FIG. 12. A first probability distribution operation 630 includes assigning a first uncertainty to the first risk value. In an embodiment, the first probability distribution operation may be implemented using an embodiment of the uncertainty assessment circuit 726 described in conjunction with FIG. 12. A second evaluation operation 640 includes determining a characteristic of a second adverse circumstance present in a second possible collision avoidance path of the vehicle. A second rating operation 650 includes assigning a second risk value to the second possible collision avoidance path responsive to the determined characteristic of the second adverse circumstance. A second probability distribution operation 660 includes assigning a second uncertainty to the second risk value. A choosing operation 670 includes selecting a collision avoidance path from the first possible collision avoidance path and the second possible collision avoidance path. The collision avoidance path is chosen in response to an evaluation of the first risk value and the first uncertainty assigned to the first risk value in view of the second risk value and the second uncertainty assigned to the second risk value. In an embodiment, the choosing operation may be implemented using the comparator circuit 728 described in conjunction with FIG. 12. A communication operation 680 includes outputting the selected collision avoidance path. For example, the selected collision avoidance path may be outputted to the vehicle operations controller 750 or the display device 734. For example, the selected collision avoidance path may be outputted to and stored by the computer readable storage media 248, or may be communicated by the communications circuit 738 to another device or system. The operational flow includes an end operation. In an embodiment, the operational flow may be implemented in a computing device 742.

In an embodiment, the operational flow 600 includes displaying a human perceivable presentation of an aspect of the selected collision avoidance path. In an embodiment, the operational flow 600 includes initiating an implementation of an aspect of the selected collision avoidance path by a control system of the vehicle.

Figure 11:
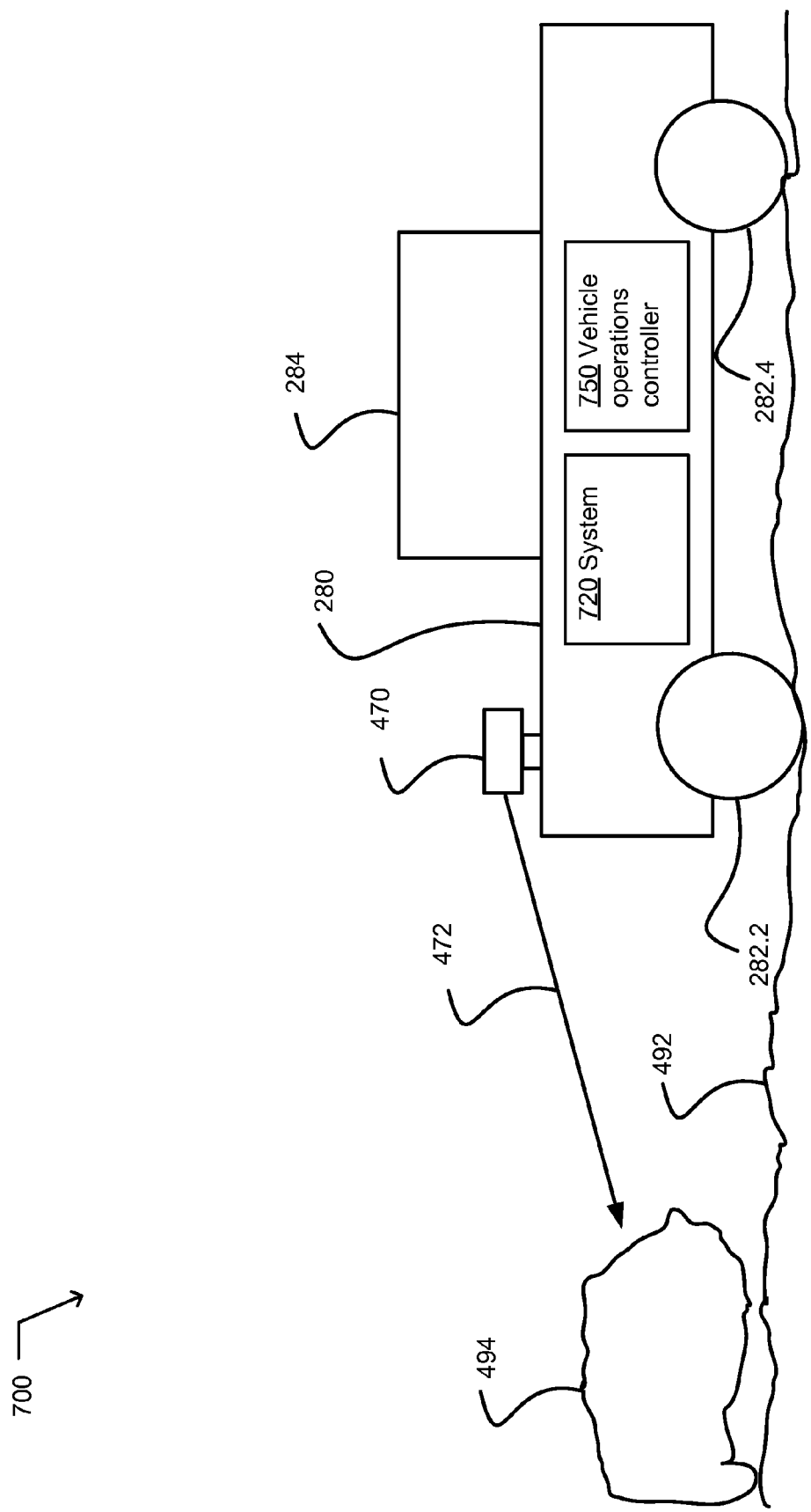
FIG. 11 illustrates an adverse circumstance present in a possible collision avoidance path of a vehicle.
Figure 12:
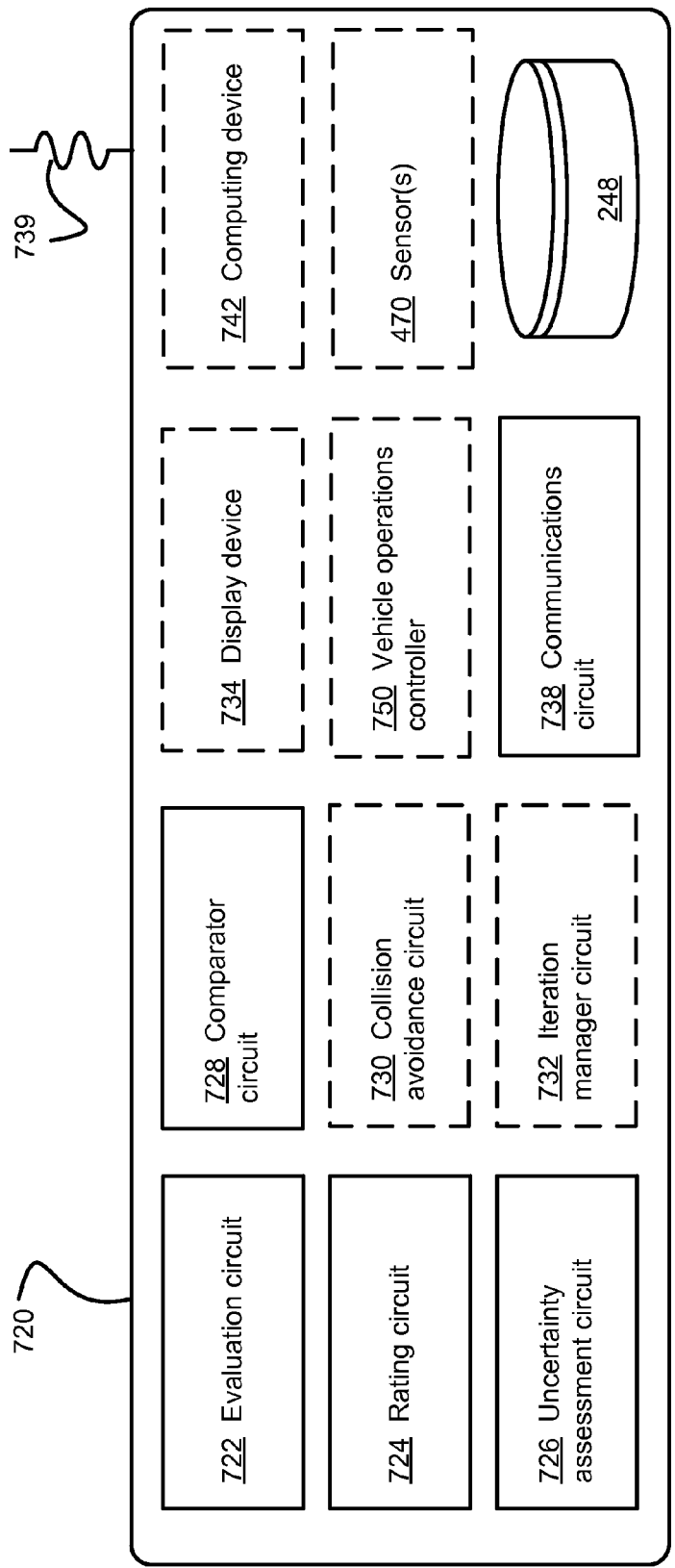
FIG. 12 schematically illustrates an embodiment of the system of the vehicle of FIG. 11.

FIG. 11 illustrates an environment 700 that includes an adverse circumstance 494 present in a possible collision avoidance path 492 of a vehicle 280. Also illustrated is a system 720. FIG. 12 schematically illustrates an embodiment of the system. The system includes an evaluation circuit 722 configured to determine a characteristic of the adverse circumstance present in the possible collision avoidance path of the vehicle. The system includes a rating circuit 724 configured to assign a risk value to the possible collision avoidance path responsive to the determined characteristic of the adverse circumstance. The system includes an uncertainty assessment circuit 726 configured to assign an uncertainty to the risk value. The system includes a comparator circuit 728 configured to determine if the risk value of the possible collision avoidance path and the uncertainty in a combination meet a threshold criteria. In one embodiment, the risk values and uncertainty are combined to yield a worst case risk value, rather than a maximum likelihood risk value. In another embodiment, the risk values and uncertainty are combined to yield a risk value in which a specified confidence exists; this may be biased towards optimistic (e.g., R(0.30)) values or more pessimistic (e.g., R(0.80)) ones. In some embodiments, other functional combinations of risk values and uncertainties can be selected by the comparator circuit 728. The system includes a communication circuit 738 configured to output the possible collision avoidance path as a selected collision avoidance path if the threshold criteria is met. In an embodiment, the communication circuit may include a wireless communication circuit 739.

In an embodiment, the system 720 includes a collision avoidance circuit 730 configured to generate at least two possible collision avoidance paths of the vehicle 280 responsive to an environment or situation indicating a possible collision threat. This embodiment also includes an iteration manager circuit 732 configured to initiate, upon a determination that a first of the at least two possible collision avoidance paths does not meet the threshold criteria, a determination if a second of the at least two collision avoidance paths meets the threshold criteria. In an embodiment of the system, the comparator circuit 728 is configured to compare the combination of the first risk value of the first possible collision avoidance path and the first uncertainty with respect to the combination of the second risk value of the second possible collision avoidance path and the second uncertainty. In this embodiment of the system, the communication circuit is configured to select a collision avoidance path from the first possible collision avoidance path or the second possible collision avoidance path in response to the comparing, and output the selected collision avoidance path. In an embodiment, the system includes an instruction generator configured to generate a collision avoidance instruction responsive to the selected collision avoidance path. The instruction generator may be implemented by the computing device 742. In an embodiment, the computing device may include the thin computing device 20 illustrated in the computing environment 19 described in conjunction with FIG. 1. In an embodiment, the computing device may include the general purpose computing device 110 described in conjunction with the general purpose computing environment 100.

In an embodiment, the system 720 includes a display device 734 configured to display a human perceivable presentation of an aspect of the selected collision avoidance path. In an embodiment, the system includes a vehicle operations controller 736 configured to initiate an implementation of an aspect of the selected collision avoidance path by the vehicle operations controller 750 of the vehicle 280. In an embodiment, the system includes the sensor 470 configured to acquire data indicative of the adverse circumstance 494 present in the possible collision avoidance path 492 of the vehicle.

Figure 13:
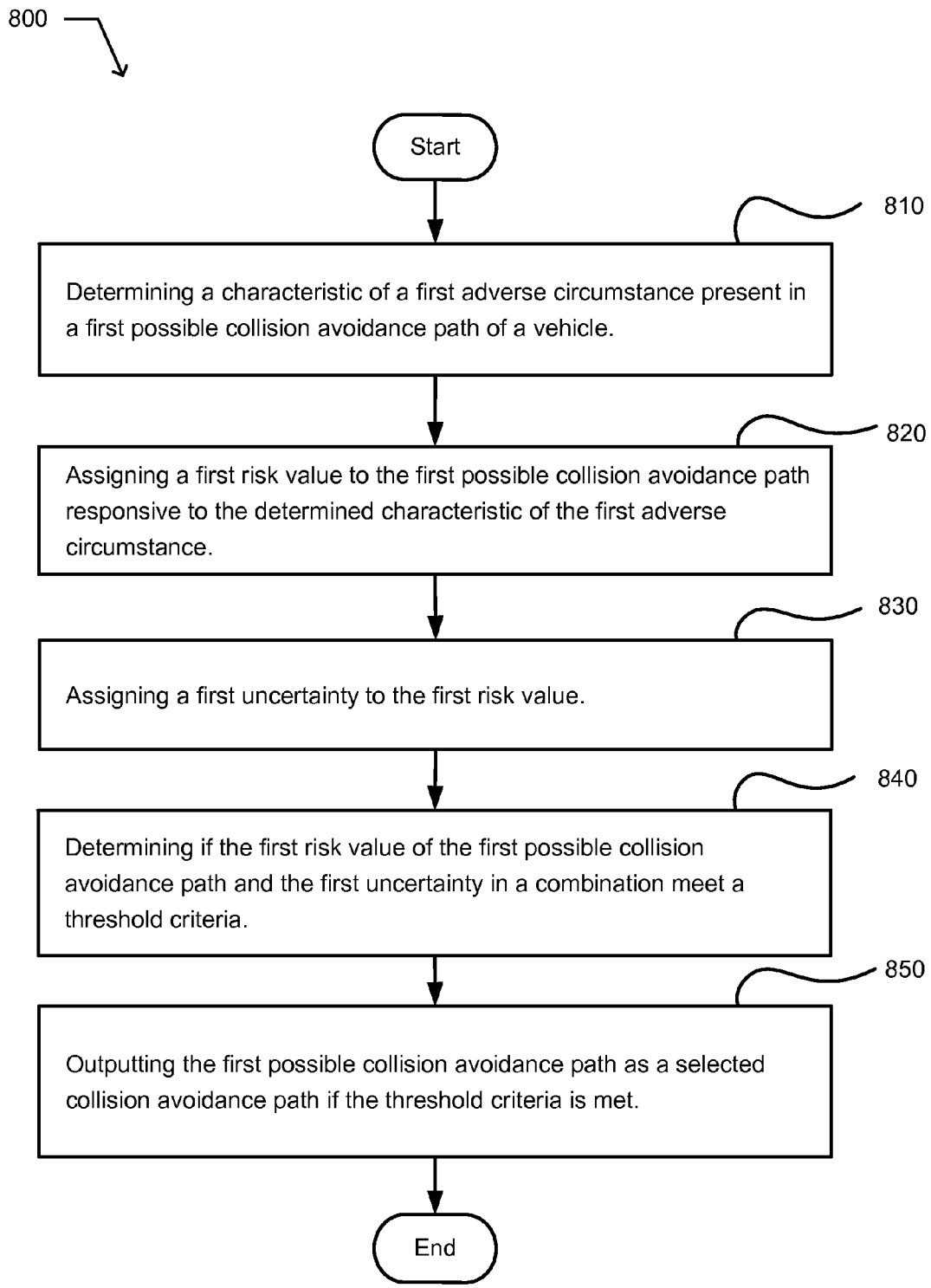
FIG. 13 illustrates an example operational flow.

FIG. 13 illustrates an example operational flow 800. After a start operation, the operational flow includes a first evaluation operation 810. The first evaluation operation includes determining a characteristic of a first adverse circumstance present in a first possible collision avoidance path of a vehicle. In an embodiment, the evaluation operation may be implemented using the evaluation circuit 722 described in conjunction with FIG. 12. A first rating operation 820 includes assigning a first risk value to the first possible collision avoidance path responsive to the determined characteristic of the first adverse circumstance. For example a first risk value may include a 45% chance of being able to follow the first possible collision avoidance path because of an exposure to ice or a car partially parked in the path. For example, the first risk value may express an evaluation of a risk relative to achieving a target or objective, i.e., following the first collision avoidance path. In an embodiment, the rating operation may be implemented using rating circuit 724 described in conjunction with FIG. 12. A first probability distribution operation 830 includes assigning a first uncertainty to the first risk value. For example, uncertainty may be measured relative an expected value or objective. The probability distribution operation may be implemented using the uncertainty assessment circuit 726 described in conjunction with FIG. 12. A first thresholding operation 840 includes determining if the first risk value of the first possible collision avoidance path and the first uncertainty in a combination meet a threshold criteria. For example, the first thresholding operation may include combining the risk value and uncertainty into a dimensionless score, and comparing the dimensionless score to a dimensionless threshold criteria. In an embodiment, the thresholding operation may be implemented using the comparator circuit 728 described in conjunction with FIG. 12. A communicating operation 850 includes outputting the first possible collision avoidance path as a selected collision avoidance path if the threshold criteria is met. For example, the selected collision avoidance path may be outputted to the vehicle operations controller 736 or the display device 734. For example, the selected collision avoidance path may be outputted to and stored by the computer readable storage media 248, or may be communicated by the communications circuit 738 to another device or system. The operational flow includes an end operation. In an embodiment, the operational flow may be implemented in a computing device 742.

In an embodiment, the threshold criteria is specified by a driver or occupant of the vehicle, or a manufacturer of the vehicle. In an embodiment, the threshold criteria is based on a driving experience level of a driver of the vehicle. In an embodiment, the threshold criteria is based on a current visibility level. In an embodiment, the threshold criteria is structured to respond to or accommodate at least two different types of risks with a single criteria or factor. For example, a first risk may include ice on the path and a second risk may include an object partially obstructing the path.

In an embodiment, the operation flow 800 includes displaying a human perceivable presentation of an aspect of the selected collision avoidance path. In an embodiment, the operation flow includes initiating an implementation of an aspect of the selected collision avoidance path by a control system of the vehicle. In an embodiment, the operation flow includes generating a collision avoidance instruction responsive to the selected collision avoidance path. For example, the generated instruction may be a human or machine useable instruction.

Figure 14:
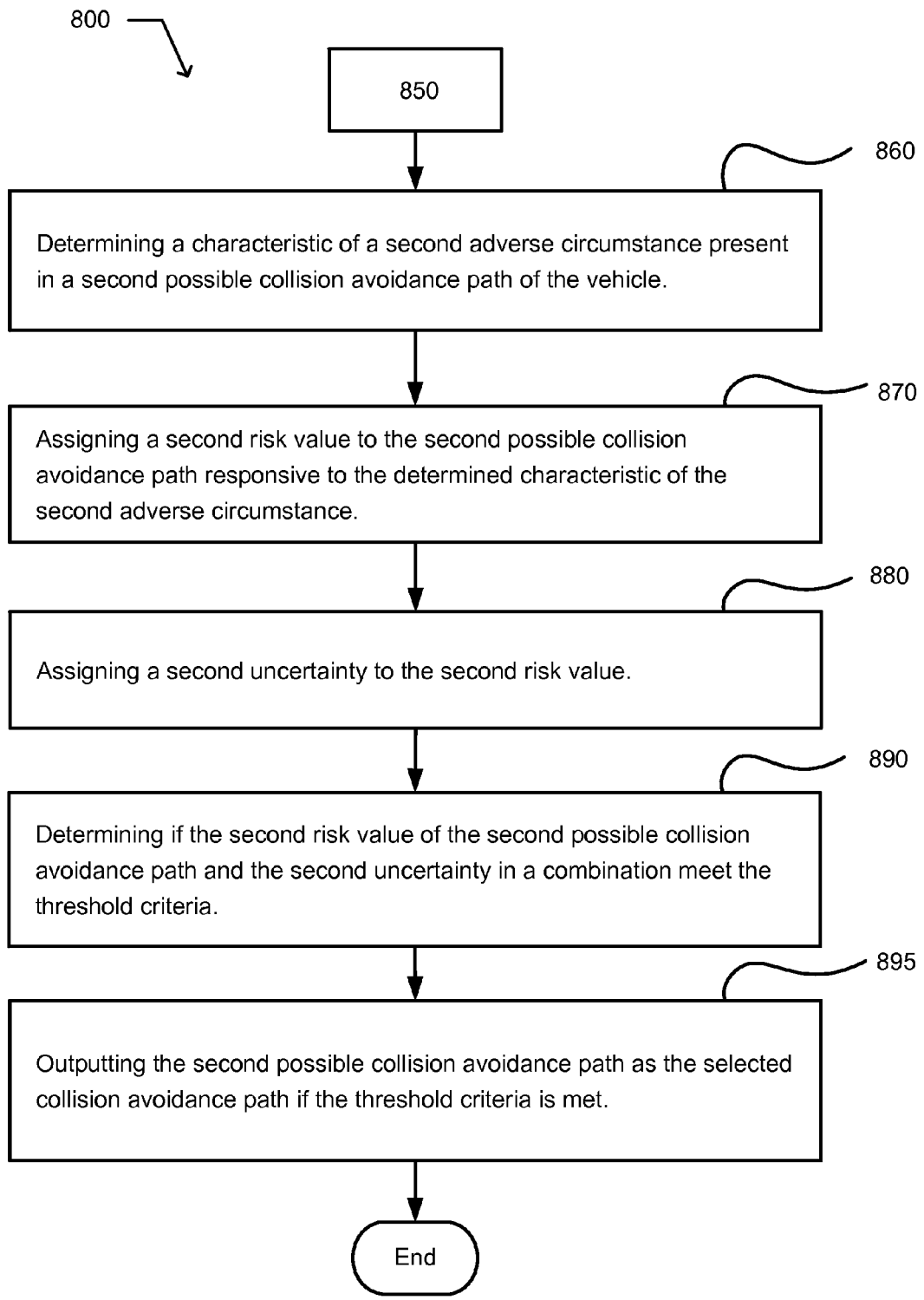
FIG. 14 illustrates an alternative embodiment of the example operational flow of FIG. 13.

FIG. 14 illustrates an alternative embodiment of the operational flow 800 of FIG. 13. In the alternative embodiment, the operational flow includes a second evaluation operation 860. The second evaluation operation includes determining a characteristic of a second adverse circumstance present in a second possible collision avoidance path of the vehicle. A second rating operation 870 includes assigning a second risk value to the second possible collision avoidance path responsive to the determined characteristic of the second adverse circumstance. A second probability distribution operation 880 includes assigning a second uncertainty to the second risk value. A second thresholding operation 890 includes determining if the second risk value of the second possible collision avoidance path and the second uncertainty in a combination meet the threshold criteria. A second communicating operation includes outputting the second possible collision avoidance path as the selected collision avoidance path if the threshold criteria is met. The alternative embodiment of the operational flow includes an end operation.

In an embodiment, the second evaluation operation 860 includes determining, if the threshold criteria is not met by the first possible collision avoidance path, a characteristic of a second adverse circumstance present in a second possible collision avoidance path of the vehicle. In an embodiment, the operational flow 800 includes displaying a human perceivable presentation of an aspect of the selected collision avoidance path. In an embodiment, the operational flow includes generating a collision avoidance instruction responsive to the selected collision avoidance path. In an embodiment, the operational flow includes initiating an implementation of an aspect of the selected collision avoidance path by a control system of the vehicle.

In an embodiment of the second thresholding operation 890, the determining includes comparing the first risk value of the first possible collision avoidance path and the first uncertainty in a combination with respect to the evaluation of the second risk value of the second possible collision avoidance path and the second uncertainty in a combination. In this embodiment, the second communicating operation 895 includes selecting a collision avoidance path from the first possible collision avoidance path or the second possible collision avoidance path in response to the comparing, and outputting the selected collision avoidance path.

Figure 15:
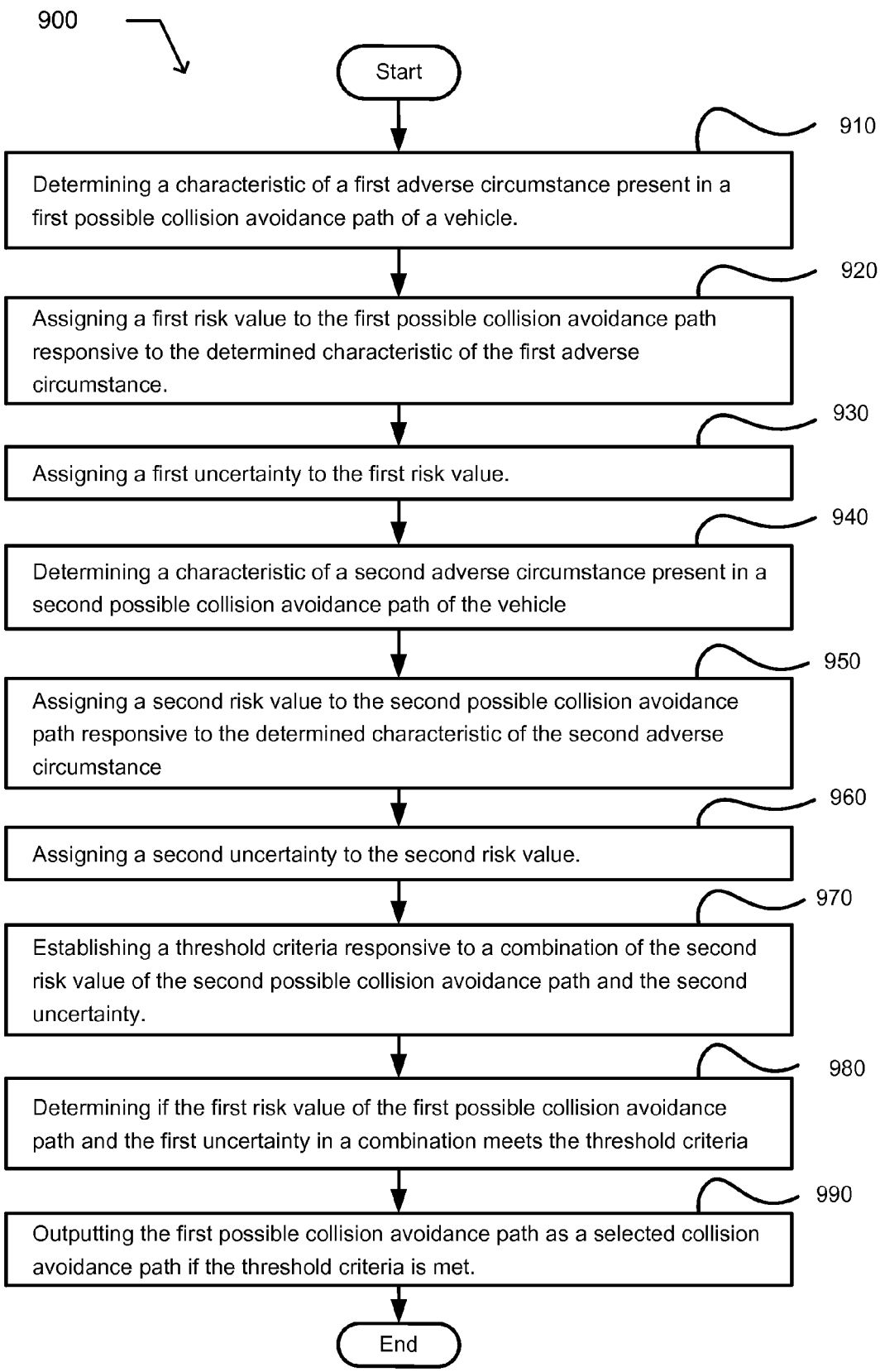
FIG. 15 illustrates an example operational flow.

FIG. 15 illustrates an example operational flow 900. After a start operation, the operational flow includes a first evaluation operation 910. The first evaluation operation includes determining a characteristic of a first adverse circumstance present in a first possible collision avoidance path of a vehicle. A first rating operation 920 includes assigning a first risk value to the first possible collision avoidance path responsive to the determined characteristic of the first adverse circumstance. A first probability distribution operation 930 includes assigning a first uncertainty to the first risk value. A second evaluation operation 940 includes determining a characteristic of a second adverse circumstance present in a second possible collision avoidance path of the vehicle. A second rating operation 950 includes assigning a second risk value to the second possible collision avoidance path responsive to the determined characteristic of the second adverse circumstance. A second probability distribution operation 960 includes assigning a second uncertainty to the second risk value. A targeting operation 970 includes establishing a threshold criteria responsive to a combination of the second risk value of the second possible collision avoidance path and the second uncertainty. A thresholding operation 980 includes determining if the first risk value of the first possible collision avoidance path and the first uncertainty in a combination meets the threshold criteria. A communicating operation 990 includes outputting the first possible collision avoidance path as a selected collision avoidance path if the threshold criteria is met. The operational flow includes an end operation. In an embodiment, the communicating operation includes outputting the second possible collision avoidance path as a selected collision avoidance path if the threshold criteria is not met.

All references cited herein are hereby incorporated by reference in their entirety or to the extent their subject matter is not otherwise inconsistent herewith.

In some embodiments, "configured" includes at least one of designed, set up, shaped, implemented, constructed, or adapted for at least one of a particular purpose, application, or function.

It will be understood that, in general, terms used herein, and especially in the appended claims, are generally intended as "open" terms. For example, the term "including" should be interpreted as "including but not limited to." For example, the term "having" should be interpreted as "having at least." For example, the term "has" should be interpreted as "having at least." For example, the term "includes" should be interpreted as "includes but is not limited to," etc. It will be further understood that if a specific number of an introduced claim recitation is intended, such an intent will be explicitly recited in the claim, and in the absence of such recitation no such intent is present. For example, as an aid to understanding, the following appended claims may contain usage of introductory phrases such as "at least one" or "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a receiver" should typically be interpreted to mean "at least one receiver"); the same holds true for the use of definite articles used to introduce claim recitations. In addition, even if a specific number of an introduced claim recitation is explicitly recited, it will be recognized that such recitation should typically be interpreted to mean at least the recited number (e.g., the bare recitation of "at least two chambers," or "a plurality of chambers," without other modifiers, typically means at least two chambers).

In those instances where a phrase such as "at least one of A, B, and C," "at least one of A, B, or C," or "an [item] selected from the group consisting of A, B, and C," is used, in general such a construction is intended to be disjunctive (e.g., any of these phrases would include but not be limited to systems that have A alone, B alone, C alone, A and B together, A and C together, B and C together, or A, B, and C together, and may further include more than one of A, B, or C, such as $A_1$, $A_2$, and C together, A, $B_1$, $B_2$, $C_1$, and $C_2$ together, or $B_1$ and $B_2$ together). It will be further understood that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The herein described aspects depict different components contained within, or connected with, examples different other components. It is to be understood that such depicted architectures are merely, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable or physically interacting components or wirelessly interactable or wirelessly interacting components.

With respect to the appended claims the recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Use of "Start," "End," "Stop," or the like blocks in the block diagrams is not intended to indicate a limitation on the beginning or end of any operations or functions in the diagram. Such flowcharts or diagrams may be incorporated into other flowcharts or diagrams where additional functions are performed before or after the functions shown in the diagrams of this application. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system comprising:
   an evaluation circuit configured to determine a characteristic of an adverse circumstance present in a possible collision avoidance path of a vehicle;
   a rating circuit configured to assign a risk value to the possible collision avoidance path responsive to the determined characteristic of the adverse circumstance, and further configured to assign an uncertainty to the assigned risk value of the possible collision avoidance path; and
   a selector circuit including a rule-set structured to select a collision avoidance path from at least two possible collision avoidance paths in response to an evaluation of a respective assigned risk value and uncertainty for each of the at least two possible collision avoidance paths.

2. The system of claim 1, wherein the characteristic of the adverse circumstance includes a characteristic of another vehicle present in the possible collision avoidance path.

3. The system of claim 2, wherein the characteristic of the another vehicle includes at least one of a size, weight, location, speed, or behavior of the another vehicle.

4. The system of claim 2, wherein the characteristic of the another vehicle includes a predicted consequence of a collision between the vehicle and the another vehicle.

5. The system of claim 1, wherein the characteristic of the adverse circumstance includes a characteristic of at least a portion of an adverse driving surface of the possible collision avoidance path.

6. The system of claim 1, wherein the characteristic of the adverse circumstance includes a characteristic of an adverse object present in the possible collision avoidance path.

7. The system of claim 1, wherein the characteristic of the adverse circumstance includes a characteristic of an adverse situation present in the possible collision avoidance path.

8. The system of claim 1, wherein the adverse circumstance includes a circumstance adverse to the vehicle successfully transiting the possible collision avoidance path.

9. The system of claim 1, wherein the characteristic of the adverse circumstance includes a characteristic of an adverse condition present in the possible collision avoidance path.

10. The system of claim 1, wherein the characteristic of the adverse circumstance is determined in response to data indicative of the adverse circumstance present in the possible collision avoidance path of the vehicle.

11. The system of claim 1, wherein the risk value is assigned based upon a capability of the vehicle to travel the possible collision avoidance path.

12. The system of claim 1, wherein the assigned uncertainty is responsive to a confidence level in the assigned risk value.

13. The system of claim 1, wherein the assigned uncertainty is responsive to a range of reasonable confidence levels in the assigned risk value.

14. The system of claim 1, wherein the assigned uncertainty is responsive to a three-point estimation technique.

15. The system of claim 1, wherein the assigned uncertainty includes risk probability distribution.

16. The system of claim 1, wherein the selector circuit includes a rule-set structured to select a collision avoidance path from at least two possible collision avoidance paths in response to an evaluation of a respective assigned risk value and an assigned uncertainty for each of the at least two possible collision avoidance paths.

17. The system of claim 1, wherein the selector circuit includes a rule-set structured to select a collision avoidance path from at least two possible collision avoidance paths in response to an evaluation of a respective assigned risk value for each of the at least two possible collision avoidance paths, wherein a first assigned risk value for a first possible collision avoidance path is responsive to a first type of adverse circumstance and a second assigned risk value for a second possible collision avoidance path is responsive to a second type of adverse circumstance.

18. The system of claim 1, wherein the selector circuit includes a rule-set structured to select the collision avoidance path having the lowest risk value from the at least two possible collision avoidance paths.

19. The system of claim 1, wherein the selector circuit includes a rule-set structured to select the collision avoidance path having the lowest risk value for a selected uncertainty level from the at least two possible collision avoidance paths.

20. The system of claim 1, further comprising:
a collision avoidance circuit configured to generate a collision avoidance instruction responsive to the selected collision avoidance path.

21. The system of claim 1, further comprising:
a collision avoidance circuit configured to generate at least two possible collision avoidance paths of the vehicle responsive to an environment or situation indicating a possible collision threat.

22. The system of claim 1, further comprising:
a display device configured to display a human perceivable presentation of an aspect of the selected collision avoidance path.

23. The system of claim 1, further comprising:
a vehicle operations controller configured to initiate an implementation of an aspect of the selected collision avoidance path by a control system of the vehicle.

24. The system of claim 1, further comprising:
a sensor configured to acquire data indicative of the adverse circumstance present in the possible collision avoidance path of the vehicle.

25. The system of claim 1, further comprising:
another sensor configured to acquire data indicative of an environment or situation external to the vehicle.

26. A system comprising:
an evaluation circuit configured to determine a characteristic of an adverse circumstance present in a possible collision avoidance path of a vehicle;
a rating circuit configured to assign a risk value to the possible collision avoidance path responsive to the determined characteristic of the adverse circumstance;
an uncertainty assessment circuit configured to assign an uncertainty to the risk value;
a threshold circuit configured to determine if the risk value of the possible collision avoidance path and the uncertainty in a combination meet a threshold criteria; and
a communication circuit configured to output the possible collision avoidance path as a selected collision avoidance path if the threshold criteria is met.

27. The system of claim 26, further comprising:
a collision avoidance circuit configured to generate at least two possible collision avoidance paths of the vehicle responsive to an environment or situation indicating a possible collision threat; and
an iteration manager circuit configured to initiate, upon a determination that a first possible collision avoidance path of the at least two possible collision avoidance paths does not meet the threshold criteria, a determination if a second possible collision avoidance path of the at least two possible collision avoidance paths meets the threshold criteria.

28. The system of claim 27:
wherein the threshold circuit is configured to compare the combination of the first risk value of the first possible collision avoidance path and the first uncertainty with respect to the combination of the second risk value of the second possible collision avoidance path and the second uncertainty; and
wherein the communication circuit is configured to select a collision avoidance path from the first possible collision avoidance path or the second possible collision avoidance path in response to the comparing, and output the selected collision avoidance path.

29. The system of claim 26, further comprising:
an instruction generator configured to generate a collision avoidance instruction responsive to the selected collision avoidance path.

30. The system of claim 26, further comprising:
a display device configured to display a human perceivable presentation of an aspect of the selected collision avoidance path.

31. The system of claim 26, further comprising:
a vehicle operations controller configured to initiate an implementation of an aspect of the selected collision avoidance path by a control system of the vehicle.

32. The system of claim 26, further comprising:
a sensor configured to acquire data indicative of the adverse circumstance present in the possible collision avoidance path of the vehicle.

* * * * *